(12) United States Patent
Smith

(10) Patent No.: US 12,005,315 B2
(45) Date of Patent: *Jun. 11, 2024

(54) CYCLING SHOE POWER SENSORS

(71) Applicant: iFIT Inc., Logan, UT (US)

(72) Inventor: Kent M. Smith, Nibley, UT (US)

(73) Assignee: iFIT Inc., Logan, UT (US)

( * ) Notice: Subject to any disclaimer, the term of this patent is extended or adjusted under 35 U.S.C. 154(b) by 892 days.

This patent is subject to a terminal disclaimer.

(21) Appl. No.: 17/024,082

(22) Filed: Sep. 17, 2020

(65) Prior Publication Data

US 2021/0001177 A1 Jan. 7, 2021

Related U.S. Application Data

(63) Continuation of application No. 16/506,085, filed on Jul. 9, 2019, now Pat. No. 10,786,706.
(Continued)

(51) Int. Cl.
*A43B 3/44* (2022.01)
*A43B 3/34* (2022.01)
(Continued)

(52) U.S. Cl.
CPC ............ *A63B 24/0062* (2013.01); *A43B 3/34* (2022.01); *A43B 5/14* (2013.01); *A63B 2220/40* (2013.01); *A63B 2220/51* (2013.01); *A63B 2220/836* (2013.01); *A63B 2225/20* (2013.01); *A63B 2225/52* (2013.01)

(58) Field of Classification Search
CPC .. A43B 5/14; A43B 5/145; A43B 3/34; A43B 3/44; B62M 3/086; A63B 24/0062; A63B 2220/40; A63B 2220/44; A63B 2220/50; A63B 2220/51; A63B 2220/836; A63B 2220/833; A61B 5/1036; A61B 5/1038
See application file for complete search history.

(56) References Cited

U.S. PATENT DOCUMENTS 3,123,646 A  3/1964 Easton
3,579,339 A  5/1971 Chang et al.
(Continued)

FOREIGN PATENT DOCUMENTS

CN  103476335 A  12/2013
CN  105050443 A  11/2015
(Continued)

OTHER PUBLICATIONS

Office Action in CN Application No. 201980047056.3, dated Jul. 28, 2021, 14 pages.
(Continued)

*Primary Examiner* — Herbert K Roberts
(74) *Attorney, Agent, or Firm* — RAY QUINNEY & NEBEKER P.C.; Paul N. Taylor

(57) ABSTRACT

A cycling shoe for measuring power includes a sole having a pocket in the bottom of the sole. A sensor platform having a plurality of sensors, at least one sensor on a top of the sensor platform and at least one sensor on the bottom of the sensor platform, is inserted into the pocket. A platform cover and a cleat are attached to the sole over the sensors. Force applied to a pedal clipped to the cleat is measured and processed.

19 Claims, 9 Drawing Sheets

Related U.S. Application Data

(60) Provisional application No. 62/697,833, filed on Jul. 13, 2018.

(51) Int. Cl.
*A43B 5/14* (2006.01)
*A63B 24/00* (2006.01)

(56) References Cited

U.S. PATENT DOCUMENTS

| | | |
|---|---|---|
| 4,023,795 A | 5/1977 | Pauls |
| 4,300,760 A | 11/1981 | Bobroff |
| D286,311 S | 10/1986 | Martinell et al. |
| 4,681,318 A | 7/1987 | Lay |
| 4,684,126 A | 8/1987 | Dalebout et al. |
| 4,728,102 A | 3/1988 | Pauls |
| 4,750,736 A | 6/1988 | Watterson |
| 4,796,881 A | 1/1989 | Watterson |
| 4,813,667 A | 3/1989 | Watterson |
| 4,830,371 A | 5/1989 | Lay |
| 4,844,451 A | 7/1989 | Bersonnet et al. |
| 4,850,585 A | 7/1989 | Dalebout |
| D304,849 S | 11/1989 | Watterson |
| 4,880,225 A | 11/1989 | Lucas et al. |
| 4,883,272 A | 11/1989 | Lay |
| D306,468 S | 3/1990 | Watterson |
| D306,891 S | 3/1990 | Watterson |
| 4,913,396 A | 4/1990 | Dalebout et al. |
| D307,614 S | 5/1990 | Bingham et al. |
| D307,615 S | 5/1990 | Bingham et al. |
| 4,921,242 A | 5/1990 | Watterson |
| 4,932,650 A | 6/1990 | Bingham et al. |
| D309,167 S | 7/1990 | Griffin |
| D309,485 S | 7/1990 | Bingham et al. |
| 4,938,478 A | 7/1990 | Lay |
| D310,253 S | 8/1990 | Bersonnet et al. |
| 4,955,599 A | 9/1990 | Bersonnet et al. |
| 4,971,316 A | 11/1990 | Dalebout et al. |
| D313,055 S | 12/1990 | Watterson |
| 4,974,832 A | 12/1990 | Dalebout |
| 4,979,737 A | 12/1990 | Kock |
| 4,981,294 A | 1/1991 | Dalebout et al. |
| D315,765 S | 3/1991 | Measom et al. |
| 4,998,725 A | 3/1991 | Watterson et al. |
| 5,000,442 A | 3/1991 | Dalebout et al. |
| 5,000,443 A | 3/1991 | Dalebout et al. |
| 5,000,444 A | 3/1991 | Dalebout et al. |
| D316,124 S | 4/1991 | Dalebout et al. |
| 5,013,033 A | 5/1991 | Watterson et al. |
| 5,014,980 A | 5/1991 | Bersonnet et al. |
| 5,016,871 A | 5/1991 | Dalebout et al. |
| D318,085 S | 7/1991 | Jacobson et al. |
| D318,086 S | 7/1991 | Bingham et al. |
| D318,699 S | 7/1991 | Jacobson et al. |
| 5,029,801 A | 7/1991 | Dalebout et al. |
| 5,034,576 A | 7/1991 | Dalebout et al. |
| 5,046,382 A | 9/1991 | Steinberg |
| 5,058,881 A | 10/1991 | Measom |
| 5,058,882 A | 10/1991 | Dalebout et al. |
| D321,388 S | 11/1991 | Dalebout |
| 5,062,626 A | 11/1991 | Dalebout et al. |
| 5,062,627 A | 11/1991 | Bingham |
| 5,062,632 A | 11/1991 | Dalebout et al. |
| 5,062,633 A | 11/1991 | Engel et al. |
| 5,067,710 A | 11/1991 | Watterson et al. |
| 5,072,929 A | 12/1991 | Peterson et al. |
| D323,009 S | 1/1992 | Dalebout et al. |
| D323,198 S | 1/1992 | Dalebout et al. |
| D323,199 S | 1/1992 | Dalebout et al. |
| D323,863 S | 2/1992 | Watterson |
| 5,088,729 A | 2/1992 | Dalebout |
| 5,090,694 A | 2/1992 | Pauls et al. |
| 5,102,380 A | 4/1992 | Jacobson et al. |
| 5,104,120 A | 4/1992 | Watterson et al. |
| 5,108,093 A | 4/1992 | Watterson |
| D326,491 S | 5/1992 | Dalebout |
| 5,122,105 A | 6/1992 | Engel et al. |
| 5,135,216 A | 8/1992 | Bingham et al. |
| 5,147,265 A | 9/1992 | Pauls et al. |
| 5,149,084 A | 9/1992 | Dalebout et al. |
| 5,149,312 A | 9/1992 | Croft et al. |
| 5,171,196 A | 12/1992 | Lynch |
| D332,347 S | 1/1993 | Raadt et al. |
| 5,190,505 A | 3/1993 | Dalebout et al. |
| 5,192,255 A | 3/1993 | Dalebout et al. |
| 5,195,937 A | 3/1993 | Engel et al. |
| 5,199,192 A | 4/1993 | Kilgore et al. |
| 5,203,826 A | 4/1993 | Dalebout |
| D335,511 S | 5/1993 | Engel et al. |
| D335,905 S | 5/1993 | Cutter et al. |
| D336,498 S | 6/1993 | Engel et al. |
| 5,217,487 A | 6/1993 | Engel et al. |
| D337,361 S | 7/1993 | Engel et al. |
| D337,666 S | 7/1993 | Peterson et al. |
| D337,799 S | 7/1993 | Cutter et al. |
| 5,226,866 A | 7/1993 | Engel et al. |
| 5,244,446 A | 9/1993 | Engel et al. |
| 5,247,853 A | 9/1993 | Dalebout |
| 5,259,611 A | 11/1993 | Dalebout et al. |
| D342,106 S | 12/1993 | Campbell et al. |
| 5,279,528 A | 1/1994 | Dalebout et al. |
| D344,112 S | 2/1994 | Smith |
| D344,557 S | 2/1994 | Ashby |
| 5,282,776 A | 2/1994 | Dalebout |
| 5,295,931 A | 3/1994 | Dreibelbis et al. |
| 5,302,161 A | 4/1994 | Loubert et al. |
| D347,251 S | 5/1994 | Dreibelbis et al. |
| 5,316,534 A | 5/1994 | Dalebout et al. |
| D348,493 S | 7/1994 | Ashby |
| D348,494 S | 7/1994 | Ashby |
| 5,328,164 A | 7/1994 | Soga |
| D349,931 S | 8/1994 | Bostic et al. |
| 5,336,142 A | 8/1994 | Dalebout et al. |
| 5,344,376 A | 9/1994 | Bostic et al. |
| D351,202 S | 10/1994 | Bingham |
| D351,435 S | 10/1994 | Peterson et al. |
| D351,633 S | 10/1994 | Bingham |
| D352,534 S | 11/1994 | Dreibelbis et al. |
| D353,422 S | 12/1994 | Bostic et al. |
| 5,372,559 A | 12/1994 | Dalebout et al. |
| 5,374,228 A | 12/1994 | Buisman et al. |
| 5,382,221 A | 1/1995 | Hsu et al. |
| 5,387,168 A | 2/1995 | Bostic |
| 5,393,690 A | 2/1995 | Fu et al. |
| D356,128 S | 3/1995 | Smith et al. |
| 5,409,435 A | 4/1995 | Daniels |
| 5,429,563 A | 7/1995 | Engel et al. |
| 5,431,612 A | 7/1995 | Holden |
| D360,915 S | 8/1995 | Bostic et al. |
| 5,468,205 A | 11/1995 | McFall et al. |
| 5,489,249 A | 2/1996 | Brewer et al. |
| 5,492,517 A | 2/1996 | Bostic et al. |
| D367,689 S | 3/1996 | Wilkinson et al. |
| 5,511,740 A | 4/1996 | Loubert et al. |
| 5,512,025 A | 4/1996 | Dalebout et al. |
| D370,949 S | 6/1996 | Furner |
| D371,176 S | 6/1996 | Furner |
| 5,527,245 A | 6/1996 | Dalebout |
| 5,529,553 A | 6/1996 | Finlayson |
| 5,540,429 A | 7/1996 | Dalebout et al. |
| 5,549,533 A | 8/1996 | Olson et al. |
| 5,554,085 A | 9/1996 | Dalebout |
| 5,569,128 A | 10/1996 | Dalebout |
| 5,591,105 A | 1/1997 | Dalebout et al. |
| 5,591,106 A | 1/1997 | Dalebout et al. |
| 5,595,556 A | 1/1997 | Dalebout et al. |
| 5,607,375 A | 3/1997 | Dalebout |
| 5,611,539 A | 3/1997 | Watterson |
| 5,622,527 A | 4/1997 | Watterson et al. |
| 5,626,538 A | 5/1997 | Dalebout et al. |
| 5,626,542 A | 5/1997 | Dalebout et al. |
| D380,024 S | 6/1997 | Novak et al. |
| 5,637,059 A | 6/1997 | Dalebout |
| D380,509 S | 7/1997 | Wilkinson et al. |

(56) References Cited

U.S. PATENT DOCUMENTS

| | | |
|---|---|---|
| 5,643,153 A | 7/1997 | Nylen et al. |
| 5,645,509 A | 7/1997 | Brewer et al. |
| D384,118 S | 9/1997 | Deblauw |
| 5,662,557 A | 9/1997 | Watterson et al. |
| 5,669,857 A | 9/1997 | Watterson et al. |
| 5,672,140 A | 9/1997 | Watterson et al. |
| 5,674,156 A | 10/1997 | Watterson et al. |
| 5,674,453 A | 10/1997 | Watterson et al. |
| 5,676,624 A | 10/1997 | Watterson et al. |
| 5,683,331 A | 11/1997 | Dalebout |
| 5,683,332 A | 11/1997 | Watterson et al. |
| D387,825 S | 12/1997 | Fleck et al. |
| 5,695,433 A | 12/1997 | Buisman |
| 5,695,434 A | 12/1997 | Dalebout et al. |
| 5,695,435 A | 12/1997 | Dalebout et al. |
| 5,702,325 A | 12/1997 | Watterson et al. |
| 5,704,879 A | 1/1998 | Watterson et al. |
| 5,718,657 A | 2/1998 | Dalebout et al. |
| 5,720,200 A | 2/1998 | Anderson et al. |
| 5,720,698 A | 2/1998 | Dalebout et al. |
| D392,006 S | 3/1998 | Dalebout et al. |
| 5,722,922 A | 3/1998 | Watterson et al. |
| 5,733,229 A | 3/1998 | Dalebout et al. |
| 5,743,833 A | 4/1998 | Watterson et al. |
| 5,762,584 A | 6/1998 | Daniels |
| 5,762,587 A | 6/1998 | Dalebout et al. |
| 5,772,560 A | 6/1998 | Watterson et al. |
| 5,810,698 A | 9/1998 | Hullett et al. |
| 5,813,142 A | 9/1998 | Demon |
| 5,827,155 A | 10/1998 | Jensen |
| 5,830,114 A | 11/1998 | Halfen et al. |
| 5,860,893 A | 1/1999 | Watterson et al. |
| 5,860,894 A | 1/1999 | Dalebout et al. |
| 5,899,834 A | 5/1999 | Dalebout et al. |
| D412,953 S | 8/1999 | Armstrong |
| D413,948 S | 9/1999 | Dalebout |
| 5,951,441 A | 9/1999 | Dalebout |
| 5,951,448 A | 9/1999 | Bolland |
| D416,596 S | 11/1999 | Armstrong |
| 6,003,166 A | 12/1999 | Hald et al. |
| 6,019,710 A | 2/2000 | Dalebout et al. |
| 6,027,429 A | 2/2000 | Daniels |
| 6,033,347 A | 3/2000 | Dalebout et al. |
| D425,940 S | 5/2000 | Halfen et al. |
| 6,059,692 A | 5/2000 | Hickman |
| D428,949 S | 8/2000 | Simonson |
| 6,123,646 A | 9/2000 | Colassi |
| 6,171,217 B1 | 1/2001 | Cutler |
| 6,171,219 B1 | 1/2001 | Simonson |
| 6,173,619 B1 * | 1/2001 | Satake ............... G01L 1/2281 73/862.622 |
| 6,174,267 B1 | 1/2001 | Dalebout |
| 6,193,631 B1 | 2/2001 | Hickman |
| 6,228,003 B1 | 5/2001 | Hald et al. |
| 6,238,323 B1 | 5/2001 | Simonson |
| 6,251,052 B1 | 6/2001 | Simonson |
| 6,261,022 B1 | 7/2001 | Dalebout et al. |
| 6,280,362 B1 | 8/2001 | Dalebout et al. |
| 6,296,594 B1 | 10/2001 | Simonson |
| D450,872 S | 11/2001 | Dalebout et al. |
| 6,312,363 B1 | 11/2001 | Watterson et al. |
| D452,338 S | 12/2001 | Dalebout et al. |
| D453,543 S | 2/2002 | Cutler |
| D453,948 S | 2/2002 | Cutler |
| 6,350,218 B1 | 2/2002 | Dalebout et al. |
| 6,387,020 B1 | 5/2002 | Simonson |
| 6,413,191 B1 | 7/2002 | Harris et al. |
| 6,422,980 B1 | 7/2002 | Simonson |
| 6,447,424 B1 | 9/2002 | Ashby et al. |
| 6,458,060 B1 | 10/2002 | Watterson et al. |
| 6,458,061 B2 | 10/2002 | Simonson |
| 6,471,622 B1 | 10/2002 | Hammer et al. |
| 6,563,225 B2 | 5/2003 | Soga et al. |
| 6,601,016 B1 | 7/2003 | Brown et al. |
| 6,623,140 B2 | 9/2003 | Watterson |
| 6,626,799 B2 | 9/2003 | Watterson et al. |
| 6,652,424 B2 | 11/2003 | Dalebout |
| 6,685,607 B1 | 2/2004 | Olson |
| 6,695,581 B2 | 2/2004 | Wasson et al. |
| 6,701,271 B2 | 3/2004 | Willner et al. |
| 6,702,719 B1 | 3/2004 | Brown et al. |
| 6,712,740 B2 | 3/2004 | Simonson |
| 6,730,002 B2 | 5/2004 | Hald et al. |
| 6,743,153 B2 | 6/2004 | Watterson et al. |
| 6,746,371 B1 | 6/2004 | Brown et al. |
| 6,749,537 B1 | 6/2004 | Hickman |
| 6,761,667 B1 | 7/2004 | Cutler et al. |
| 6,770,015 B2 | 8/2004 | Simonson |
| 6,786,852 B2 | 9/2004 | Watterson et al. |
| 6,808,472 B1 | 10/2004 | Hickman |
| 6,821,230 B2 | 11/2004 | Dalebout et al. |
| 6,830,540 B2 | 12/2004 | Watterson |
| 6,863,641 B1 | 3/2005 | Brown et al. |
| 6,866,613 B1 | 3/2005 | Brown et al. |
| 6,875,160 B2 | 4/2005 | Watterson et al. |
| D507,311 S | 7/2005 | Butler et al. |
| 6,918,858 B2 | 7/2005 | Watterson et al. |
| 6,921,351 B1 | 7/2005 | Hickman et al. |
| 6,974,404 B1 | 12/2005 | Watterson et al. |
| 6,997,852 B2 | 2/2006 | Watterson et al. |
| 7,025,713 B2 | 4/2006 | Dalebout |
| D520,085 S | 5/2006 | Willardson et al. |
| 7,044,897 B2 | 5/2006 | Myers et al. |
| 7,052,442 B2 | 5/2006 | Watterson |
| 7,060,006 B1 | 6/2006 | Watterson et al. |
| 7,060,008 B2 | 6/2006 | Watterson et al. |
| 7,070,539 B2 | 7/2006 | Brown et al. |
| 7,097,588 B2 | 8/2006 | Watterson |
| D527,776 S | 9/2006 | Willardson et al. |
| 7,112,168 B2 | 9/2006 | Dalebout et al. |
| 7,128,693 B2 | 10/2006 | Brown et al. |
| 7,166,062 B1 | 1/2007 | Watterson et al. |
| 7,166,064 B2 | 1/2007 | Watterson et al. |
| 7,169,087 B2 | 1/2007 | Ercanbrack et al. |
| 7,169,093 B2 | 1/2007 | Simonson et al. |
| 7,192,388 B2 | 3/2007 | Dalebout et al. |
| 7,250,022 B2 | 7/2007 | Dalebout |
| 7,282,016 B2 | 10/2007 | Simonson |
| 7,285,075 B2 | 10/2007 | Cutler et al. |
| 7,344,481 B2 | 3/2008 | Watterson et al. |
| 7,377,882 B2 | 5/2008 | Watterson |
| 7,425,188 B2 | 9/2008 | Ercanbrack |
| 7,429,236 B2 | 9/2008 | Dalebout et al. |
| 7,455,622 B2 | 11/2008 | Watterson et al. |
| 7,482,050 B2 | 1/2009 | Olson |
| D588,655 S | 3/2009 | Utykanski |
| 7,510,509 B2 | 3/2009 | Hickman |
| 7,537,546 B2 | 5/2009 | Watterson et al. |
| 7,537,549 B2 | 5/2009 | Nelson et al. |
| 7,537,552 B2 | 5/2009 | Dalebout et al. |
| 7,540,828 B2 | 6/2009 | Watterson et al. |
| 7,549,947 B2 | 6/2009 | Hickman et al. |
| 7,556,590 B2 | 7/2009 | Watterson et al. |
| 7,563,203 B2 | 7/2009 | Dalebout et al. |
| 7,575,536 B1 | 8/2009 | Hickman |
| 7,601,105 B1 | 10/2009 | Gipson, III et al. |
| 7,604,573 B2 | 10/2009 | Dalebout et al. |
| D604,373 S | 11/2009 | Dalebout et al. |
| 7,618,350 B2 | 11/2009 | Dalebout et al. |
| 7,618,357 B2 | 11/2009 | Dalebout |
| 7,625,315 B2 | 12/2009 | Hickman |
| 7,625,321 B2 | 12/2009 | Simonson et al. |
| 7,628,730 B1 | 12/2009 | Watterson et al. |
| 7,628,737 B2 | 12/2009 | Kowallis et al. |
| 7,637,847 B1 | 12/2009 | Hickman |
| 7,645,212 B2 | 1/2010 | Ashby et al. |
| 7,645,213 B2 | 1/2010 | Watterson |
| 7,658,698 B2 | 2/2010 | Pacheco et al. |
| 7,674,205 B2 | 3/2010 | Dalebout et al. |
| 7,713,171 B1 | 5/2010 | Hickman |
| 7,713,172 B2 | 5/2010 | Watterson et al. |
| 7,713,180 B2 | 5/2010 | Wickens |
| 7,717,828 B2 | 5/2010 | Simonson et al. |
| 7,736,279 B2 | 6/2010 | Dalebout et al. |

(56) References Cited

U.S. PATENT DOCUMENTS

| | | |
|---|---|---|
| 7,740,563 B2 | 6/2010 | Dalebout et al. |
| 7,749,144 B2 | 7/2010 | Hammer |
| 7,766,797 B2 | 8/2010 | Dalebout |
| 7,771,329 B2 | 8/2010 | Dalebout et al. |
| 7,775,940 B2 | 8/2010 | Dalebout et al. |
| 7,789,800 B1 | 9/2010 | Watterson et al. |
| 7,798,946 B2 | 9/2010 | Dalebout et al. |
| 7,815,550 B2 | 10/2010 | Watterson et al. |
| 7,837,595 B2 | 11/2010 | Rice |
| 7,839,058 B1 | 11/2010 | Churchill |
| 7,857,731 B2 | 12/2010 | Hickman et al. |
| 7,862,475 B2 | 1/2011 | Watterson |
| 7,862,478 B2 | 1/2011 | Watterson et al. |
| 7,862,483 B2 | 1/2011 | Hendrickson et al. |
| D635,207 S | 3/2011 | Dalebout et al. |
| 7,901,330 B2 | 3/2011 | Dalebout et al. |
| 7,909,740 B2 | 3/2011 | Dalebout et al. |
| 7,980,996 B2 | 7/2011 | Hickman |
| 7,981,000 B2 | 7/2011 | Watterson et al. |
| 7,985,164 B2 | 7/2011 | Ashby |
| 8,011,242 B2 | 9/2011 | O'neill |
| 8,029,415 B2 | 10/2011 | Ashby et al. |
| 8,033,959 B2 | 10/2011 | Oleson |
| 8,033,960 B1 | 10/2011 | Dalebout et al. |
| D650,451 S | 12/2011 | Olson et al. |
| D652,877 S | 1/2012 | Dalebout et al. |
| 8,122,773 B2 | 2/2012 | Wyatt |
| 8,152,702 B2 | 4/2012 | Pacheco |
| D659,775 S | 5/2012 | Olson et al. |
| D659,777 S | 5/2012 | Watterson et al. |
| D660,383 S | 5/2012 | Watterson et al. |
| D664,613 S | 7/2012 | Dalebout et al. |
| 8,251,874 B2 | 8/2012 | Ashby et al. |
| 8,298,123 B2 | 10/2012 | Hickman |
| 8,298,125 B2 | 10/2012 | Colledge et al. |
| D671,177 S | 11/2012 | Sip |
| D671,178 S | 11/2012 | Sip |
| 8,327,723 B2 | 12/2012 | Roudergues |
| D673,626 S | 1/2013 | Olson et al. |
| 8,370,087 B2 | 2/2013 | Zhu |
| 8,387,470 B2 | 3/2013 | Tuulari |
| 8,522,625 B2 | 9/2013 | Philipps |
| 8,584,520 B2 | 11/2013 | Kokkoneva |
| 8,683,874 B2 | 4/2014 | Limacher |
| 8,690,735 B2 | 4/2014 | Watterson et al. |
| D707,763 S | 6/2014 | Cutler |
| 8,740,753 B2 | 6/2014 | Olson et al. |
| 8,758,201 B2 | 6/2014 | Ashby et al. |
| 8,762,077 B2 | 6/2014 | Redmond |
| 8,771,153 B2 | 7/2014 | Dalebout et al. |
| 8,784,270 B2 | 7/2014 | Watterson |
| 8,808,148 B2 | 8/2014 | Watterson |
| 8,814,762 B2 | 8/2014 | Butler |
| D712,493 S | 9/2014 | Ercanbrack et al. |
| 8,840,075 B2 | 9/2014 | Olson |
| 8,844,371 B2 | 9/2014 | Limacher |
| 8,845,493 B2 | 9/2014 | Watterson et al. |
| 8,870,726 B2 | 10/2014 | Watterson et al. |
| 8,876,668 B2 | 11/2014 | Hendrickson et al. |
| 8,894,549 B2 | 11/2014 | Colledge |
| 8,894,555 B2 | 11/2014 | Olson |
| 8,911,330 B2 | 12/2014 | Watterson et al. |
| 8,920,288 B2 | 12/2014 | Dalebout |
| 8,986,165 B2 | 3/2015 | Ashby |
| 8,992,364 B2 | 3/2015 | Law et al. |
| 8,992,387 B2 | 3/2015 | Watterson et al. |
| D726,476 S | 4/2015 | Ercanbrack |
| 9,028,368 B2 | 5/2015 | Ashby et al. |
| 9,028,370 B2 | 5/2015 | Watterson |
| 9,039,578 B2 | 5/2015 | Dalebout |
| D731,011 S | 6/2015 | Buchanan |
| 9,063,026 B2 | 6/2015 | Nassef |
| 9,072,930 B2 | 7/2015 | Ashby et al. |
| 9,119,983 B2 | 9/2015 | Rhea |
| 9,123,317 B2 | 9/2015 | Watterson et al. |
| 9,126,071 B2 | 9/2015 | Smith |
| 9,126,072 B2 | 9/2015 | Watterson |
| 9,138,615 B2 | 9/2015 | Olson et al. |
| 9,142,139 B2 | 9/2015 | Watterson et al. |
| 9,144,703 B2 | 9/2015 | Dalebout et al. |
| 9,149,683 B2 | 9/2015 | Smith |
| 9,186,535 B2 | 11/2015 | Ercanbrack |
| 9,186,549 B2 | 11/2015 | Watterson et al. |
| 9,254,409 B2 | 2/2016 | Dalebout et al. |
| 9,254,416 B2 | 2/2016 | Ashby |
| 9,278,248 B2 | 3/2016 | Tyger |
| 9,278,249 B2 | 3/2016 | Watterson |
| 9,278,250 B2 | 3/2016 | Buchanan |
| 9,289,648 B2 | 3/2016 | Watterson |
| 9,331,559 B2 | 5/2016 | Shastry |
| 9,339,691 B2 | 5/2016 | Brammer |
| 9,352,185 B2 | 5/2016 | Hendrickson et al. |
| 9,352,186 B2 | 5/2016 | Watterson |
| 9,375,605 B2 | 6/2016 | Tyger |
| 9,381,394 B2 | 7/2016 | Mortensen et al. |
| 9,387,387 B2 | 7/2016 | Dalebout |
| 9,393,453 B2 | 7/2016 | Watterson |
| 9,403,047 B2 | 8/2016 | Olson |
| 9,403,051 B2 | 8/2016 | Cutler |
| 9,421,416 B2 | 8/2016 | Mortensen et al. |
| 9,457,219 B2 | 10/2016 | Smith |
| 9,457,220 B2 | 10/2016 | Olson |
| 9,457,222 B2 | 10/2016 | Dalebout |
| 9,460,632 B2 | 10/2016 | Watterson |
| 9,463,356 B2 | 10/2016 | Rhea |
| 9,468,794 B2 | 10/2016 | Barton |
| 9,468,798 B2 | 10/2016 | Dalebout |
| 9,476,741 B2 | 10/2016 | Hollmach |
| 9,480,874 B2 | 11/2016 | Cutler |
| 9,492,704 B2 | 11/2016 | Mortensen et al. |
| 9,498,668 B2 | 11/2016 | Smith |
| 9,517,378 B2 | 12/2016 | Ashby et al. |
| 9,521,901 B2 | 12/2016 | Dalebout |
| 9,533,187 B2 | 1/2017 | Dalebout |
| 9,539,461 B2 | 1/2017 | Ercanbrack |
| 9,579,544 B2 | 2/2017 | Watterson |
| 9,586,086 B2 | 3/2017 | Dalebout et al. |
| 9,586,090 B2 | 3/2017 | Watterson et al. |
| 9,604,099 B2 | 3/2017 | Taylor |
| 9,616,276 B2 | 4/2017 | Dalebout |
| 9,616,278 B2 | 4/2017 | Olson |
| 9,623,281 B2 | 4/2017 | Hendrickson |
| 9,636,567 B2 | 5/2017 | Brammer et al. |
| 9,675,839 B2 | 6/2017 | Dalebout |
| 9,682,307 B2 | 6/2017 | Dalebout |
| 9,694,234 B2 | 7/2017 | Dalebout et al. |
| 9,694,242 B2 | 7/2017 | Ashby |
| 9,737,755 B2 | 8/2017 | Dalebout |
| 9,757,605 B2 | 9/2017 | Olson et al. |
| 9,764,186 B2 | 9/2017 | Dalebout |
| 9,767,785 B2 | 9/2017 | Ashby |
| 9,795,822 B2 | 10/2017 | Smith et al. |
| 9,808,672 B2 | 11/2017 | Dalebout |
| 9,849,326 B2 | 12/2017 | Smith |
| 9,878,210 B2 | 1/2018 | Watterson |
| 9,889,334 B2 | 2/2018 | Ashby et al. |
| 9,889,339 B2 | 2/2018 | Douglass |
| 9,937,376 B2 | 4/2018 | McInelly et al. |
| 9,937,377 B2 | 4/2018 | McInelly et al. |
| 9,937,378 B2 | 4/2018 | Dalebout et al. |
| 9,937,379 B2 | 4/2018 | Mortensen |
| 9,943,719 B2 | 4/2018 | Smith et al. |
| 9,943,722 B2 | 4/2018 | Dalebout |
| 9,948,037 B2 | 4/2018 | Ashby |
| 9,968,816 B2 | 5/2018 | Olson et al. |
| 9,968,821 B2 | 5/2018 | Finlayson et al. |
| 9,968,823 B2 | 5/2018 | Cutler |
| 10,010,755 B2 | 7/2018 | Watterson |
| 10,010,756 B2 | 7/2018 | Watterson |
| 10,029,145 B2 | 7/2018 | Douglass |
| D826,350 S | 8/2018 | Hochstrasser |
| 10,046,196 B2 | 8/2018 | Ercanbrack |
| D827,733 S | 9/2018 | Hochstrasser |
| 10,065,064 B2 | 9/2018 | Smith et al. |

(56) References Cited

U.S. PATENT DOCUMENTS

| | | |
|---|---|---|
| 10,071,285 B2 | 9/2018 | Smith et al. |
| 10,085,586 B2 | 10/2018 | Smith et al. |
| 10,086,254 B2 | 10/2018 | Watterson |
| 10,136,842 B2 | 11/2018 | Ashby |
| 10,186,161 B2 | 1/2019 | Watterson |
| 10,188,890 B2 | 1/2019 | Olson |
| 10,207,143 B2 | 2/2019 | Dalebout |
| 10,207,145 B2 | 2/2019 | Tyger |
| 10,207,147 B2 | 2/2019 | Ercanbrack |
| 10,207,148 B2 | 2/2019 | Powell |
| 10,212,994 B2 | 2/2019 | Watterson |
| 10,220,259 B2 | 3/2019 | Brammer |
| 10,226,396 B2 | 3/2019 | Ashby |
| 10,226,664 B2 | 3/2019 | Dalebout |
| 10,252,109 B2 | 4/2019 | Watterson |
| 10,258,828 B2 | 4/2019 | Dalebout |
| 10,272,317 B2 | 4/2019 | Watterson |
| 10,279,212 B2 | 5/2019 | Dalebout et al. |
| 10,293,211 B2 | 5/2019 | Watterson et al. |
| D852,292 S | 6/2019 | Cutler |
| 10,343,017 B2 | 7/2019 | Jackson |
| 10,376,736 B2 | 8/2019 | Powell et al. |
| 10,388,183 B2 | 8/2019 | Watterson |
| 10,391,361 B2 | 8/2019 | Watterson |
| D864,320 S | 10/2019 | Weston |
| D864,321 S | 10/2019 | Weston |
| 10,426,989 B2 | 10/2019 | Dalebout |
| 10,433,612 B2 | 10/2019 | Ashby |
| 10,441,840 B2 | 10/2019 | Dalebout |
| 10,441,844 B2 | 10/2019 | Powell |
| 10,449,416 B2 | 10/2019 | Dalebout |
| 10,471,299 B2 | 11/2019 | Powell |
| D868,909 S | 12/2019 | Cutler et al. |
| 10,492,519 B2 | 12/2019 | Capell et al. |
| 10,493,349 B2 | 12/2019 | Watterson |
| 10,500,473 B2 | 12/2019 | Watterson |
| 10,537,764 B2 | 1/2020 | Smith et al. |
| 10,543,395 B2 | 1/2020 | Powell et al. |
| 10,561,877 B2 | 2/2020 | Workman |
| 10,561,893 B2 | 2/2020 | Chatterton et al. |
| 10,561,894 B2 | 2/2020 | Dalebout et al. |
| 10,569,121 B2 | 2/2020 | Watterson |
| 10,569,123 B2 | 2/2020 | Hochstrasser et al. |
| 10,625,114 B2 | 4/2020 | Ercanbrack |
| 10,625,137 B2 | 4/2020 | Dalebout et al. |
| 10,661,114 B2 | 5/2020 | Watterson et al. |
| 10,668,320 B2 | 6/2020 | Watterson |
| 10,671,705 B2 | 6/2020 | Capell et al. |
| 10,688,346 B2 | 6/2020 | Brammer |
| 10,702,736 B2 | 7/2020 | Weston et al. |
| 10,709,925 B2 | 7/2020 | Dalebout et al. |
| 10,726,730 B2 | 7/2020 | Watterson |
| 10,729,965 B2 | 8/2020 | Powell |
| 10,758,767 B2 | 9/2020 | Olson et al. |
| 10,786,706 B2 | 9/2020 | Smith |
| 10,864,407 B2 | 12/2020 | Watterson et al. |
| 10,918,905 B2 | 2/2021 | Powell et al. |
| 10,932,517 B2 | 3/2021 | Ashby et al. |
| 10,940,360 B2 | 3/2021 | Dalebout et al. |
| 10,953,268 B1 | 3/2021 | Dalebout et al. |
| 10,953,305 B2 | 3/2021 | Dalebout et al. |
| 10,967,214 B1 | 4/2021 | Olson et al. |
| 10,994,173 B2 | 5/2021 | Watterson |
| 11,000,730 B2 | 5/2021 | Dalebout et al. |
| 11,013,960 B2 | 5/2021 | Watterson et al. |
| 11,033,777 B1 | 6/2021 | Watterson et al. |
| 11,058,913 B2 | 7/2021 | Dalebout et al. |
| 11,058,914 B2 | 7/2021 | Powell |
| 11,058,918 B1 | 7/2021 | Watterson et al. |
| 11,187,285 B2 | 11/2021 | Wrobel |
| 11,298,577 B2 | 4/2022 | Watterson |
| 11,326,673 B2 | 5/2022 | Buchanan |
| 11,338,169 B2 | 5/2022 | Dalebout et al. |
| 11,338,175 B2 | 5/2022 | Watterson et al. |
| 11,426,633 B2 | 8/2022 | Watterson et al. |
| 11,451,108 B2 | 9/2022 | Tinney |
| 11,452,903 B2 | 9/2022 | Watterson |
| 11,511,152 B2 | 11/2022 | Powell et al. |
| 11,534,651 B2 | 12/2022 | Ercanbrack et al. |
| 11,534,654 B2 | 12/2022 | Silcock et al. |
| 11,534,655 B2 | 12/2022 | Dalebout et al. |
| 11,565,148 B2 | 1/2023 | Dalebout et al. |
| 11,596,830 B2 | 3/2023 | Dalebout et al. |
| 11,642,564 B2 | 5/2023 | Watterson |
| 11,673,036 B2 | 6/2023 | Dalebout et al. |
| 11,680,611 B2 | 6/2023 | Wrobel |
| 11,700,905 B2 | 7/2023 | Ashby et al. |
| 11,708,874 B2 | 7/2023 | Wrobel |
| 2002/0016235 A1 | 2/2002 | Ashby et al. |
| 2002/0077221 A1 | 6/2002 | Dalebout et al. |
| 2002/0159253 A1 | 10/2002 | Dalebout et al. |
| 2003/0045406 A1 | 3/2003 | Stone |
| 2004/0091307 A1 | 5/2004 | James |
| 2004/0171464 A1 | 9/2004 | Ashby et al. |
| 2004/0171465 A1 | 9/2004 | Hald et al. |
| 2005/0049123 A1 | 3/2005 | Dalebout et al. |
| 2005/0077805 A1 | 4/2005 | Dalebout et al. |
| 2005/0107229 A1 | 5/2005 | Wickens |
| 2005/0164839 A1 | 7/2005 | Watterson et al. |
| 2005/0272577 A1 | 12/2005 | Olson et al. |
| 2006/0248965 A1 | 11/2006 | Wyatt |
| 2007/0117683 A1 | 5/2007 | Ercanbrack et al. |
| 2007/0130804 A1 | 6/2007 | Levy |
| 2007/0254778 A1 | 11/2007 | Ashby |
| 2008/0051256 A1 | 2/2008 | Ashby et al. |
| 2008/0229875 A1 | 9/2008 | Ray |
| 2008/0242520 A1 | 10/2008 | Hubbard |
| 2008/0300110 A1 | 12/2008 | Smith et al. |
| 2009/0105052 A1 | 4/2009 | Dalebout et al. |
| 2009/0308179 A1* | 12/2009 | Wyatt ................ A61B 5/0002 73/818 |
| 2010/0242246 A1 | 9/2010 | Dalebout et al. |
| 2011/0054359 A1 | 3/2011 | Sazonov |
| 2011/0087446 A1* | 4/2011 | Redmond ............. G01D 21/00 73/379.01 |
| 2012/0237911 A1 | 9/2012 | Watterson |
| 2012/0295774 A1 | 11/2012 | Dalebout et al. |
| 2013/0123083 A1 | 5/2013 | Sip |
| 2013/0154441 A1 | 6/2013 | Redmond |
| 2013/0165195 A1 | 6/2013 | Watterson |
| 2013/0172152 A1 | 7/2013 | Watterson |
| 2013/0172153 A1 | 7/2013 | Watterson |
| 2013/0178334 A1 | 7/2013 | Brammer |
| 2013/0178768 A1 | 7/2013 | Dalebout |
| 2013/0190136 A1 | 7/2013 | Watterson |
| 2013/0196298 A1 | 8/2013 | Watterson |
| 2013/0196821 A1 | 8/2013 | Watterson et al. |
| 2013/0196822 A1 | 8/2013 | Watterson et al. |
| 2013/0218585 A1 | 8/2013 | Watterson |
| 2013/0244836 A1 | 9/2013 | Maughan |
| 2013/0267383 A1 | 10/2013 | Watterson |
| 2013/0268101 A1 | 10/2013 | Brammer |
| 2013/0274067 A1 | 10/2013 | Watterson et al. |
| 2013/0281241 A1 | 10/2013 | Watterson |
| 2013/0298428 A1* | 11/2013 | Tews .................... A43C 15/16 36/134 |
| 2014/0024499 A1 | 1/2014 | Watterson |
| 2014/0073970 A1 | 3/2014 | Ashby |
| 2014/0121071 A1 | 5/2014 | Strom et al. |
| 2014/0135173 A1 | 5/2014 | Watterson |
| 2014/0274574 A1 | 9/2014 | Shorten et al. |
| 2014/0274579 A1 | 9/2014 | Olson |
| 2014/0287884 A1 | 9/2014 | Buchanan |
| 2014/0309085 A1 | 10/2014 | Watterson et al. |
| 2015/0177083 A1* | 6/2015 | Redmond ............. G01L 3/245 73/379.01 |
| 2015/0182779 A1 | 7/2015 | Dalebout |
| 2015/0182781 A1 | 7/2015 | Watterson |
| 2015/0238817 A1 | 8/2015 | Watterson |
| 2015/0250418 A1 | 9/2015 | Ashby |
| 2015/0251055 A1 | 9/2015 | Ashby |
| 2015/0253210 A1 | 9/2015 | Ashby et al. |
| 2015/0253735 A1 | 9/2015 | Watterson |
| 2015/0253736 A1 | 9/2015 | Watterson |

(56) References Cited

U.S. PATENT DOCUMENTS

| | | |
|---|---|---|
| 2015/0258560 A1 | 9/2015 | Ashby |
| 2015/0327386 A1* | 11/2015 | Yarmis .............. A63B 24/0062 29/829 |
| 2015/0352396 A1 | 12/2015 | Dalebout |
| 2016/0058335 A1 | 3/2016 | Ashby |
| 2016/0063615 A1 | 3/2016 | Watterson |
| 2016/0092909 A1 | 3/2016 | Watterson |
| 2016/0101311 A1 | 4/2016 | Workman |
| 2016/0107065 A1 | 4/2016 | Brammer |
| 2016/0121074 A1 | 5/2016 | Ashby |
| 2016/0148535 A1 | 5/2016 | Ashby |
| 2016/0148536 A1 | 5/2016 | Ashby |
| 2016/0158595 A1 | 6/2016 | Dalebout |
| 2016/0206922 A1 | 7/2016 | Dalebout et al. |
| 2016/0219968 A1 | 8/2016 | Martin |
| 2016/0250519 A1 | 9/2016 | Watterson |
| 2016/0253918 A1 | 9/2016 | Watterson |
| 2016/0346595 A1 | 12/2016 | Dalebout et al. |
| 2017/0036053 A1 | 2/2017 | Smith et al. |
| 2017/0056711 A1 | 3/2017 | Dalebout et al. |
| 2017/0056715 A1 | 3/2017 | Dalebout et al. |
| 2017/0056726 A1 | 3/2017 | Dalebout et al. |
| 2017/0059422 A1* | 3/2017 | Choi ......................... G01L 1/22 |
| 2017/0124912 A1 | 5/2017 | Ashby et al. |
| 2017/0193578 A1 | 7/2017 | Watterson |
| 2017/0266481 A1 | 9/2017 | Dalebout |
| 2017/0266483 A1 | 9/2017 | Dalebout et al. |
| 2017/0266489 A1 | 9/2017 | Douglass et al. |
| 2017/0266533 A1 | 9/2017 | Dalebout |
| 2017/0270820 A1 | 9/2017 | Ashby |
| 2018/0001135 A1 | 1/2018 | Powell |
| 2018/0036585 A1 | 2/2018 | Powell |
| 2018/0085630 A1 | 3/2018 | Capell et al. |
| 2018/0089396 A1 | 3/2018 | Capell et al. |
| 2018/0099116 A1 | 4/2018 | Ashby |
| 2018/0099179 A1 | 4/2018 | Chatterton et al. |
| 2018/0099180 A1 | 4/2018 | Wilkinson |
| 2018/0111034 A1 | 4/2018 | Watterson |
| 2018/0117383 A1 | 5/2018 | Workman |
| 2018/0117385 A1 | 5/2018 | Watterson et al. |
| 2018/0117393 A1 | 5/2018 | Ercanbrack |
| 2018/0154205 A1 | 6/2018 | Watterson |
| 2018/0154207 A1 | 6/2018 | Hochstrasser |
| 2018/0154209 A1 | 6/2018 | Watterson |
| 2018/0200566 A1 | 7/2018 | Weston |
| 2019/0058370 A1 | 2/2019 | Tinney |
| 2019/0080624 A1 | 3/2019 | Watterson |
| 2019/0151698 A1 | 5/2019 | Olson |
| 2019/0168072 A1 | 6/2019 | Brammer |
| 2019/0178313 A1 | 6/2019 | Wrobel |
| 2019/0192898 A1 | 6/2019 | Dalebout |
| 2019/0192952 A1 | 6/2019 | Powell |
| 2019/0209893 A1 | 7/2019 | Watterson |
| 2019/0223612 A1 | 7/2019 | Watterson |
| 2019/0232112 A1 | 8/2019 | Dalebout |
| 2019/0269958 A1 | 9/2019 | Dalebout et al. |
| 2019/0269971 A1 | 9/2019 | Capell et al. |
| 2019/0275366 A1 | 9/2019 | Powell |
| 2019/0282852 A1 | 9/2019 | Dalebout |
| 2019/0328079 A1 | 10/2019 | Ashby et al. |
| 2019/0329091 A1 | 10/2019 | Powell et al. |
| 2019/0376585 A1 | 12/2019 | Buchanan |
| 2020/0009417 A1 | 1/2020 | Dalebout |
| 2020/0016459 A1 | 1/2020 | Smith |
| 2020/0368575 A1 | 11/2020 | Hays et al. |
| 2020/0391069 A1 | 12/2020 | Olson et al. |
| 2021/0001177 A1 | 1/2021 | Smith |
| 2021/0046353 A1 | 2/2021 | Dalebout et al. |
| 2021/0106899 A1 | 4/2021 | Willardson et al. |
| 2021/0110910 A1 | 4/2021 | Ostler et al. |
| 2021/0146221 A1 | 5/2021 | Dalebout et al. |
| 2021/0213331 A1 | 7/2021 | Watterson |
| 2021/0268336 A1 | 9/2021 | Watterson et al. |
| 2021/0291013 A1 | 9/2021 | Nascimento |
| 2021/0299518 A1 | 9/2021 | Brammer et al. |
| 2021/0299542 A1 | 9/2021 | Brammer et al. |
| 2021/0339079 A1 | 11/2021 | Dalebout et al. |
| 2022/0062685 A1 | 3/2022 | Ashby et al. |
| 2022/0104992 A1 | 4/2022 | Ashby |
| 2022/0212052 A1 | 7/2022 | Ercanbrack et al. |
| 2022/0241649 A1 | 8/2022 | Ashby |
| 2022/0241665 A1 | 8/2022 | Dalebout et al. |
| 2022/0241668 A1 | 8/2022 | Willardson et al. |
| 2022/0249912 A1 | 8/2022 | Watterson et al. |
| 2022/0257994 A1 | 8/2022 | Smith |
| 2022/0258007 A1 | 8/2022 | Watterson et al. |
| 2022/0258008 A1 | 8/2022 | Watterson et al. |
| 2022/0266085 A1 | 8/2022 | Dalebout et al. |
| 2022/0280857 A1 | 9/2022 | Watterson |
| 2022/0309042 A1 | 9/2022 | Archer |
| 2022/0314078 A1 | 10/2022 | Watterson et al. |
| 2022/0323827 A1 | 10/2022 | Watterson et al. |
| 2022/0339493 A1 | 10/2022 | Larsen |
| 2022/0339520 A1 | 10/2022 | Toth |
| 2022/0342969 A1 | 10/2022 | Watterson et al. |
| 2022/0347516 A1 | 11/2022 | Taylor |
| 2022/0347548 A1 | 11/2022 | Watterson |
| 2022/0362613 A1 | 11/2022 | Watterson et al. |
| 2022/0362624 A1 | 11/2022 | Dalebout |
| 2022/0395729 A1 | 12/2022 | Toth |
| 2023/0039903 A1 | 2/2023 | Brammer et al. |
| 2023/0054845 A1 | 2/2023 | Smith |
| 2023/0122235 A1 | 4/2023 | Ashby et al. |
| 2023/0128721 A1 | 4/2023 | Plummer |
| 2023/0158358 A1 | 5/2023 | Ercanbrack et al. |
| 2023/0181993 A1 | 6/2023 | Taylor et al. |
| 2023/0191189 A1 | 6/2023 | Taylor et al. |
| 2023/0191197 A1 | 6/2023 | Ashby |
| 2023/0218975 A1 | 7/2023 | Toles et al. |
| 2023/0226401 A1 | 7/2023 | Watterson |

FOREIGN PATENT DOCUMENTS

| | | |
|---|---|---|
| CN | 105266257 A | 1/2016 |
| CN | 106482875 | 3/2017 |
| KR | 101458386 | 11/2014 |
| TW | M424795 | 3/2012 |
| TW | M447216 | 2/2013 |
| WO | 2009082215 | 7/2009 |

OTHER PUBLICATIONS

Taiwan Notice of Allowance with English translation issued in application 108121411 dated Nov. 6, 2020.
Chinese Decision of Rejection with English translation issued in application 201980047056.3 dated Mar. 11, 2022.
Chinese Office Action with English translation issued in application 201980047056.3 dated Nov. 24, 2021.
Chinese Office Action with English translation issued in application 201980047056.3 dated Jul. 28, 2021.
European Extended Search Report issued in 19834920.1 dated Mar. 25, 2022.
U.S. Appl. No. 16/742,762, filed Jan. 14, 2020, Watterson et al.
U.S. Appl. No. 16/750,925, filed Jan. 23, 2020, Silcock et al.
U.S. Appl. No. 16/780,765, filed Feb. 3, 2020, Watterson.
U.S. Appl. No. 16/787,850, filed Feb. 11, 2020, Watterson.
U.S. Appl. No. 62/914,007, filed Oct. 11, 2019, Willardson et al.
U.S. Appl. No. 13/088,007, filed Apr. 15, 2011, Watterson et al.
U.S. Appl. No. 15/973,176, filed May 7, 2018, Douglass.
U.S. Appl. No. 29/702,127, filed Aug. 16, 2019, Cutler et al.
U.S. Appl. No. 62/796,952, filed Jan. 25, 2019, Silcock et al.
U.S. Appl. No. 62/804,146, filed Feb. 11, 2019, Watterson.
U.S. Appl. No. 62/804,685, filed Feb. 12, 2019, Watterson et al.
U.S. Appl. No. 62/852,118, filed May 23, 2019, Hays et al.
U.S. Appl. No. 62/866,576, filed Jun. 25, 2019, Capell.
U.S. Appl. No. 62/887,391, filed Aug. 15, 2019, Ercanbrack et al.
U.S. Appl. No. 62/887,398, filed Aug. 15, 2019, Dalebout et al.
U.S. Appl. No. 62/897,113, filed Sep. 6, 2019, Ostler et al.
International Search Report and Written Opinion issued for PCT/US2019/041014 dated Oct. 25, 2019.

(56) References Cited

OTHER PUBLICATIONS

International Search Report issued for PCT/US2015/019492 dated May 22, 2015.
Taiwan Search Report and Office Action issued in application No. 104107623 dated Mar. 16, 2016.
U.S. Appl. No. 17/066,485, filed Oct. 9, 2020, Weston et al.
U.S. Appl. No. 17/739,819, filed May 9, 2022, Buchanan.
U.S. Appl. No. 17/841,313, filed Jun. 15, 2022, Weston et al.
U.S. Appl. No. 17/963,822, filed Oct. 11, 2022, Powell.
U.S. Appl. No. 18/091,004, filed Dec. 29, 2022, Cox.
U.S. Appl. No. 18/103,221, filed Jan. 30, 2023, Dalebout et al.
U.S. Appl. No. 18/114,758, filed Feb. 27, 2023, Cutler et al.
U.S. Appl. No. 18/117,263, filed Mar. 3, 2023, Smith et al.
U.S. Appl. No. 18/123,026, filed Mar. 17, 2023, Silcock et al.
U.S. Appl. No. 18/132,277, filed Apr. 7, 2023, Vasquez et al.
U.S. Appl. No. 18/136,535, filed Apr. 19, 2023, Ashby et al.
U.S. Appl. No. 18/141,872, filed May 1, 2023, Ashby et al.
U.S. Appl. No. 18/205,299, filed Jun. 2, 2023, Wrobel.
U.S. Appl. No. 18/207,512, filed Jun. 8, 2023, Chuang.
U.S. Appl. No. 18/210,505, filed Jun. 15, 2023, Nielsen et al.
U.S. Appl. No. 62/273,852, filed Dec. 31, 2015, Watterson.
U.S. Appl. No. 63/073,081, filed Sep. 1, 2021, Ashby et al.
U.S. Appl. No. 63/079,697, filed Sep. 7, 2020, Willardson et al.
U.S. Appl. No. 63/086,793, filed Oct. 20, 2020, Ashby.
U.S. Appl. No. 63/134,036, filed Jan. 5, 2021, Ercanbrack et al.
U.S. Appl. No. 63/150,066, filed Feb. 16, 2021, Smith.
U.S. Appl. No. 63/156,801, filed Mar. 4, 2021, Watterson.
U.S. Appl. No. 63/165,498, filed Mar. 24, 2021, Archer.
U.S. Appl. No. 63/179,094, filed Apr. 23, 2021, Watterson et al.
U.S. Appl. No. 63/180,521, filed Apr. 27, 2021, Watterson et al.
U.S. Appl. No. 63/187,348, filed May 11, 2021, Dalebout et al.
U.S. Appl. No. 63/188,431, filed May 13, 2021, Plummer.
U.S. Appl. No. 63/200,903, filed Apr. 2, 2021, Watterson et al.
U.S. Appl. No. 63/211,870, filed Jun. 17, 2021, Watterson et al.
U.S. Appl. No. 63/216,313, filed Jun. 29, 2021, Watterson et al.
U.S. Appl. No. 63/229,794, filed Aug. 12, 2021, Brammer.
U.S. Appl. No. 63/235,002, filed Aug. 19, 2021, Smith.
U.S. Appl. No. 63/254,470, filed Oct. 11, 2021, Powell.
U.S. Appl. No. 63/278,714, filed Nov. 12, 2021, Taylor.
U.S. Appl. No. 63/289,997, filed Dec. 15, 2021, Taylor et al.
U.S. Appl. No. 63/290,455, filed Dec. 16, 2021, Taylor et al.
U.S. Appl. No. 63/290,557, filed Dec. 16, 2021, Ashby.
U.S. Appl. No. 63/298,170, filed Jan. 10, 2022, Ercanbrack et al.
U.S. Appl. No. 63/299,357, filed Jan. 13, 2022, Toles et al.
U.S. Appl. No. 63/305,976, filed Feb. 2, 2022, Watterson.
U.S. Appl. No. 63/329,270, filed Apr. 8, 2022, Vasquez et al.
U.S. Appl. No. 63/322,581, filed Apr. 25, 2022, Ashby et al.
U.S. Appl. No. 63/338,265, filed May 4, 2022, Ashby et al.
U.S. Appl. No. 63/350,072, filed Jun. 8, 2022, Chuang.
U.S. Appl. No. 63/352,539, filed Jun. 15, 2022, Nielsen et al.
U.S. Appl. No. 63/471,680, filed Jun. 7, 2023, Powell et al.

\* cited by examiner

CYCLING SHOE POWER SENSORS

CROSS-REFERENCE TO RELATED APPLICATIONS

This application is a continuation of U.S. application Ser. No. 16/506,085, filed Jul. 9, 2019, which claims priority to U.S. Provisional Patent Application Ser. No. 62/697,833 entitled "Cycling Shoe Power Sensors" filed Jul. 13, 2018, which applications are herein incorporated by reference for all that they discloses.

BACKGROUND

Background and Relevant Art

Cycling is a popular recreational and professional sport. As cyclists progress in the sport, many desire to improve their performance. One way to measure performance is to time how long a cyclist takes to ride a given course. However, it is difficult for cyclists to compare performance for different rides on different courses. Part of this difficulty arises from the many variables that can significantly affect an individual cyclist's performance, such as weather conditions and road conditions. Part of this difficulty also arises from the variables among different courses, including altitude, elevation change, and bicycle construction.

One metric that cyclists use to measure performance that is independent of the time it takes to ride a given course is cycling power. Cycling power is a measure of the power applied by the cyclist to a bicycle. Cycling power measures the force applied to the pedals and crank of a bicycle over a portion of the pedal's rotation for a time interval. Cycling power is a metric that is somewhat independent of road conditions, weather conditions, and elevation change, and therefore is a preferred training and comparison statistic by amateur and professional cyclists alike. Because cycling power is a measure of the force applied to the pedal and crank, power is conventionally measured at the pedal or at the crank.

Biometrics can be tracked through various wearable devices, such as incorporated into a shoe or other articles of clothing. One example of a shoe configured to collect biometric information is described in U.S. patent application Ser. No. 15/821,386 to Ashby, filed Nov. 22, 2017. A shoe has an insole with an opening to a cavity. A sensor is inserted into the cavity. The sensor includes an accelerometer and/or gyroscope to collect movement information of the user's shoes during use.

Another example of an unobtrusive tracking device is disclosed in U.S. Pat. No. 9,224,291 to Moll-Carrillo et al., issued Dec. 29, 2013. Moll-Carrillo discloses recording and displaying athletic data using a computing device such as a mobile communication device during physical activity. The mobile communication device provides options for defining and recording athletic activity performed by the user. The options include content item selection and rendering controls. Moll-Carrillo also discloses route selection and controls.

Yet another example of an unobtrusive tracking device is disclosed in U.S. Pat. No. 8,749,380 to Vock et al., issued Jun. 10, 2014. Vock is directed to tracking the usage of a shoe with a shoe wear-out sensor. Vock further discloses a body bar sensing system for sensing movement of a body bar can be provided. The body bar sensing system includes a housing coupled to the body bar, a detector disposed within the housing to sense movement of the body bar, and a processor to determine a number of repetitions of the movement based on the sensed movement. The body bar sensing system also includes a display to communicate the determined number of repetitions of the movement to a user.

BRIEF SUMMARY

In some embodiments, a device for measuring exercise power may include a shoe having a pocket in an outside surface of the sole of the shoe. A sensor platform having at least one sensor on a top of the sensor platform and at least one sensor on a bottom of the sensor platform may be configured to be placed in the pocket.

In other embodiments, a system for measuring cycling power may include a cycling shoe. A sensor platform having a plurality of sensors may be fastened to an outside of the sole using a plurality of platform fasteners. A cleat may be attached to the sole using a plurality of cleat fasteners and be configured to releasably connect to a bicycle pedal.

In still other embodiments, a method for measuring cycling power may include inserting a sensor platform having a plurality of sensor into a pocket located on an outer surface of a cycling shoe. A cleat may be secured to the sole using a plurality of cleat fasteners and clipped to a pedal attached to a crank. The crank may be rotated by applying a force through the cycling shoe to the pedal. A magnitude of the force may be measured by the plurality of sensors on the sensor platform and the magnitude of the force may be processed using a processor.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 1-2 is a perspective view of the cycling shoe of FIG. 1-1 having a platform cover over the sensor platform, according to at least one embodiment of the present disclosure;

FIG. 1-3 is another perspective view of the cycling shoe of FIGS. 1-1 and 1-2 having a cleat attached to the platform cover, according to at least one embodiment of the present disclosure;

FIG. 2-1 is a top view of a sensor platform, according to at least one embodiment of the present disclosure;

FIG. 2-2 is a bottom view of the sensor platform of FIG. 2-1, according to at least one embodiment of the present disclosure;

FIG. 3 is a top view of a sole of a cycling shoe, according to at least one embodiment of the present disclosure;

DETAILED DESCRIPTION

Figure 1:
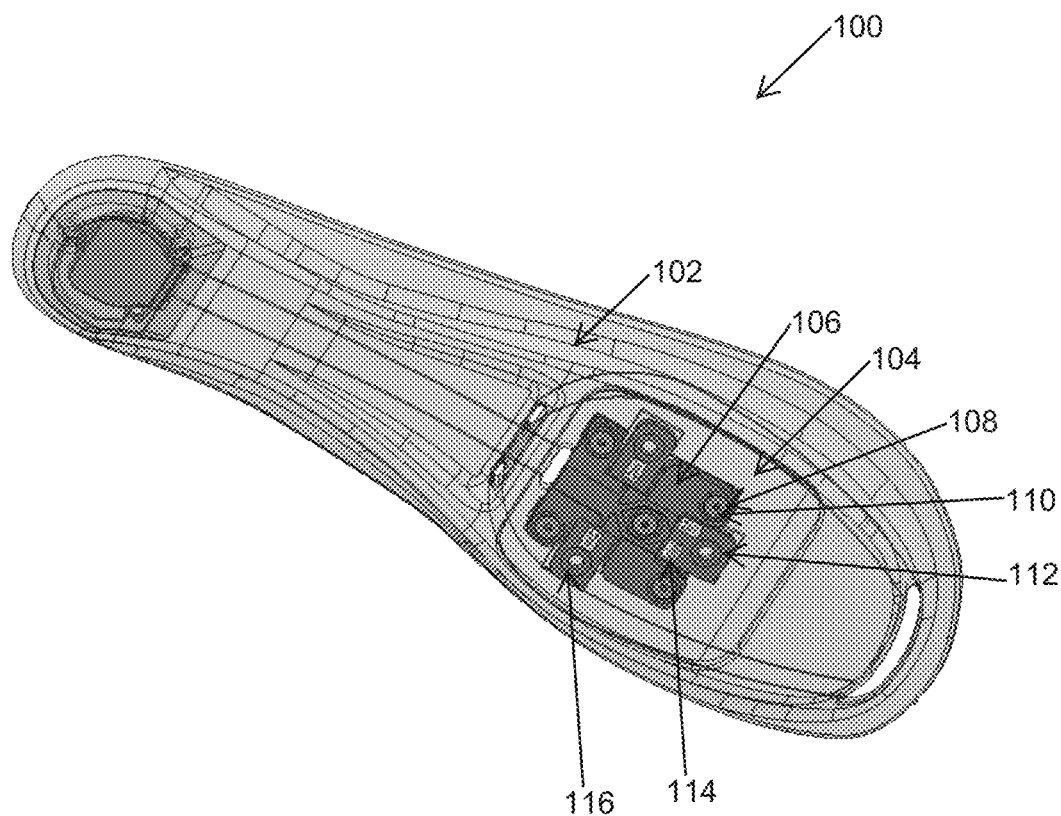
FIG. 1-1 is a perspective view of the sole of a cycling shoe having a sensor platform, according to at least one embodiment of the present disclosure.

FIG. 1-1 is a perspective view of a cycling shoe 100, according to at least one embodiment of the present disclosure. In some embodiments, the cycling shoe 100 includes a sole 102 with a pocket 104. In some embodiments, the pocket 104 is located on a bottom of the sole 102. In other embodiments, the pocket 104 is located on a top of the sole 102, or, in other words, on the inside of the cycling shoe 100. In some embodiments, the pocket 104 is located on the ball of the cycling shoe 100, or in other words, the front half of the shoe, or where the ball of a foot of a user would be located while wearing the cycling shoe 100.

In some embodiments, the sole 102 is fabricated from carbon fiber. In other embodiments, the sole 102 is fabricated from fiberglass, nylon, PVC, or any other stiff material. The pocket 104 may be molded into the sole 102. For example, a carbon fiber sole 102 may have a mold against which the plies of carbon fiber may be laid, followed by injection or coating of the plies with a matrix, such as epoxy or a thermoplastic. In some embodiments, the sole 102 is fabricated using additive manufacturing, the pocket 104 included in the sole 102 at the time of manufacturing. In other embodiments, the sole 102 is fabricated from a piece of material into which the pocket 104 is machined or milled. For example, the sole 102 may include a thermoplastic polyurethane (TPU), other solid polymer, metal, or metal alloy; and a portion of the sole 102 may be removed to create the pocket 104.

The pocket 104 may include a sensor platform 106. In some embodiments, the pocket 104 is formed to fit the dimensions of the sensor platform 106. In other embodiments, the pocket 104 is formed to accommodate multiple sizes and/or shapes of sensor platforms 106.

In some embodiments, the pocket 104 is open, meaning that the sensor platform 106 may be placed directly in the pocket 104. In other embodiments, the pocket 104 is enclosed, meaning that the sensor platform 106 may be inserted into a small slot or opening into the pocket 104 such that the sensor platform 106 may be substantially enclosed by the pocket 104 when inserted. For example, a substantially enclosed pocket 104 may have a volume of the enclosed pocket 104 at least 80% surrounded by the sole 102.

The sensor platform 106 may include a plurality of platform fastener inserts 108. The platform fastener inserts 108 may be oriented in a pattern around the sensor platform 106. In some embodiments, the sensor platform 106 includes five platform fastener inserts 108. In other embodiments, the sensor platform 106 includes any other number of platform fastener inserts 108, including three, four, six, seven, or eight platform fastener inserts 108. In some embodiments, the sole 102 includes a plurality of sole connections having a matching pattern to the platform fastener inserts 108. In other words, the sole 102 may include the same number of sole connections in the same layout as the sensor platform 106.

Still referring to FIG. 1-1, a plurality of platform fasteners 110 inserted into the plurality of platform fastener inserts 108 and the plurality of sole connections may secure the sensor platform 106 to the sole 102. In some embodiments, the plurality of platform fasteners 110 have a threaded connection. In other embodiments, the plurality of platform fasteners 110 have a press-fit connection. In still other embodiments, the plurality of platform fasteners 110 have a nut and bolt connection to compress the sensor platform 106 to the sole 102. In yet other embodiments, the plurality of platform fasteners 110 have any type of connection designed to secure the sensor platform 106 to the sole 102.

The sensor platform 106 may include a plurality of cleat supports 112 including a plurality of sensors 114. In some embodiments, the sensor platform 106 includes three cleat supports 112. For example, the sensor platform 106 may include cleat supports 112 configured to attach to a standard three-bolt cleat system road biking cleat, such as the SHIMANO SPD-SL. In other embodiments, the sensor platform 106 includes two cleat supports 112. For example, the sensor platform 106 may include cleat supports 112 configured to attach to a standard two-bolt cleat system biking cleat, such as the SHIMANO SPD. In still other embodiments, the sensor platform 106 includes four cleat supports 112 configured to attach to a standard four-bolt cleat system biking cleat, such as used by SPEEDPLAY cleats and pedals.

In some embodiments, a cleat support 112 includes a cleat connection 116. The cleat connection 116 may be configured to connect to a standard cleat bolt, such as those used to attach cleats to cycling shoes.

Figures 1, 2:
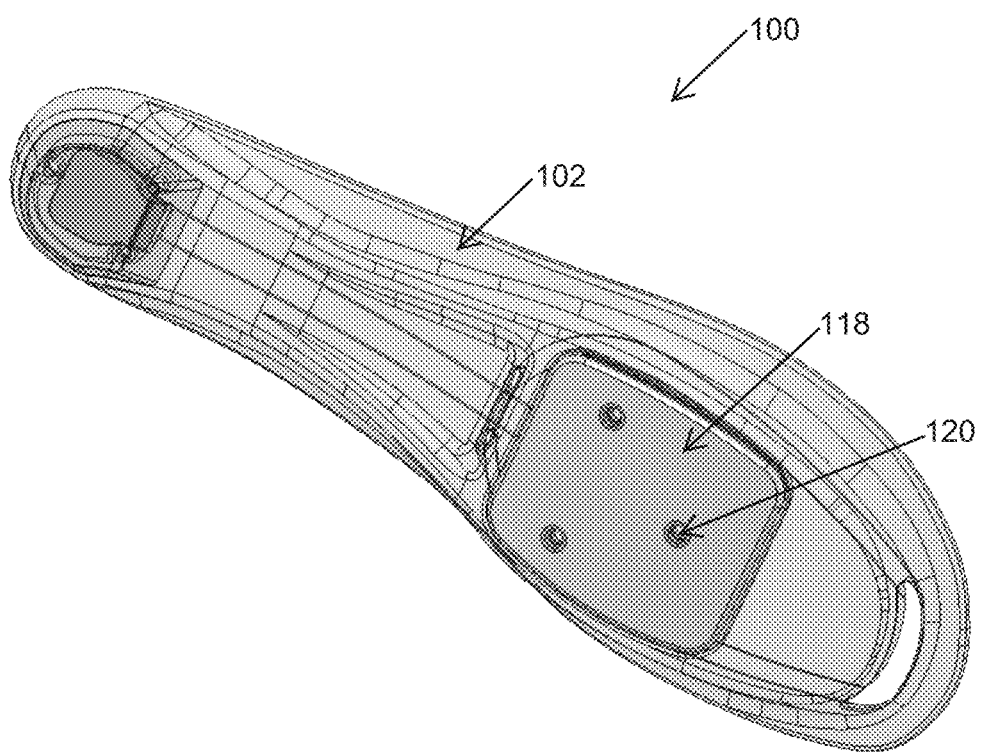

FIG. 1-2 is a representation of the cycling shoe 100 of FIG. 1-2 including a sensor platform cover 118. In some embodiments, the sensor platform cover 118 is configured to match the peripheral outline and/or contour of the pocket in the sole 102 (e.g., pocket 104 of FIG. 1-1). In other embodiments, the sensor platform cover 118 is larger than the outline or contour of the pocket in the sole 102. In yet other embodiments, the sensor platform cover 118 is smaller than the outline or contour of the pocket in the sole 102.

In some embodiments, the sensor platform cover 118 connects to the sole 102 using a snap-fit with the pocket. In other embodiments, the sensor platform cover 118 connects to the sole 102 using a plurality of cover cleat connectors 120. The cover cleat connectors 120 may have the same pattern as the cleat supports (e.g., cleat supports 112 of FIG. 1-1). Thus, sensor platform cover 118 may include two, three, or four cover cleat connectors 120 arranged in a pattern to connect to a standard cleat. In this manner, connecting a cleat (not shown) to the sole 102 through the cover cleat connectors 120 and the sensor platform cleat connection (e.g., cleat connection 116 of FIG. 1-1), may secure the sensor platform cover 118 to the sensor platform (e.g., sensor platform 106 of FIG. 1-1) and the sole 102.

Figures 1, 2, 3:
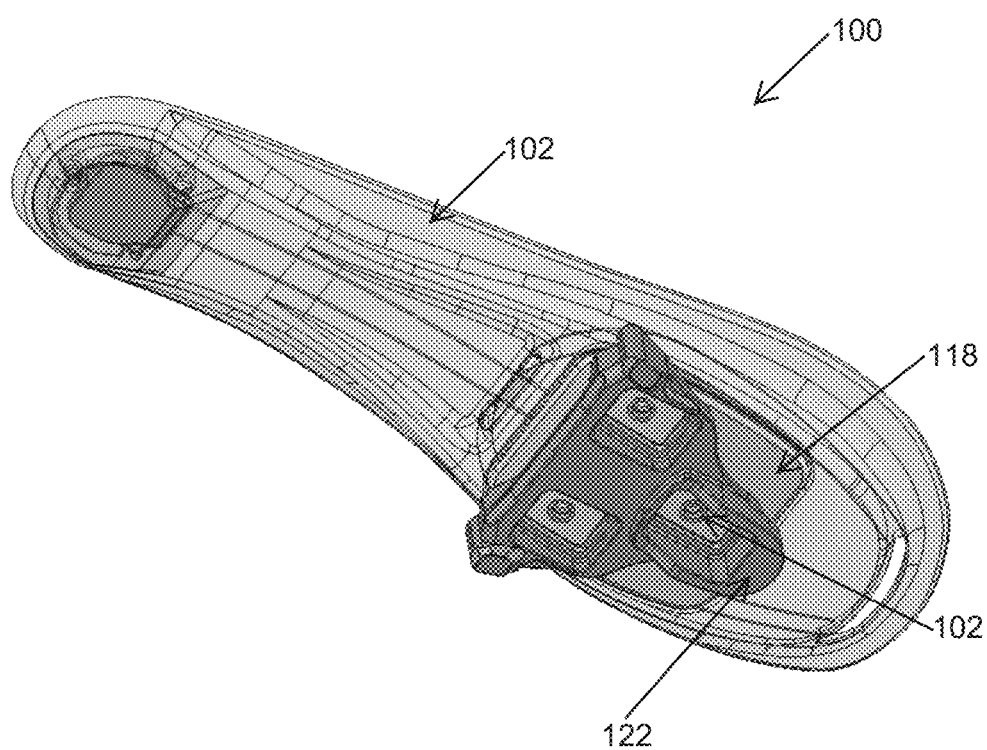
Figures 1, 2:
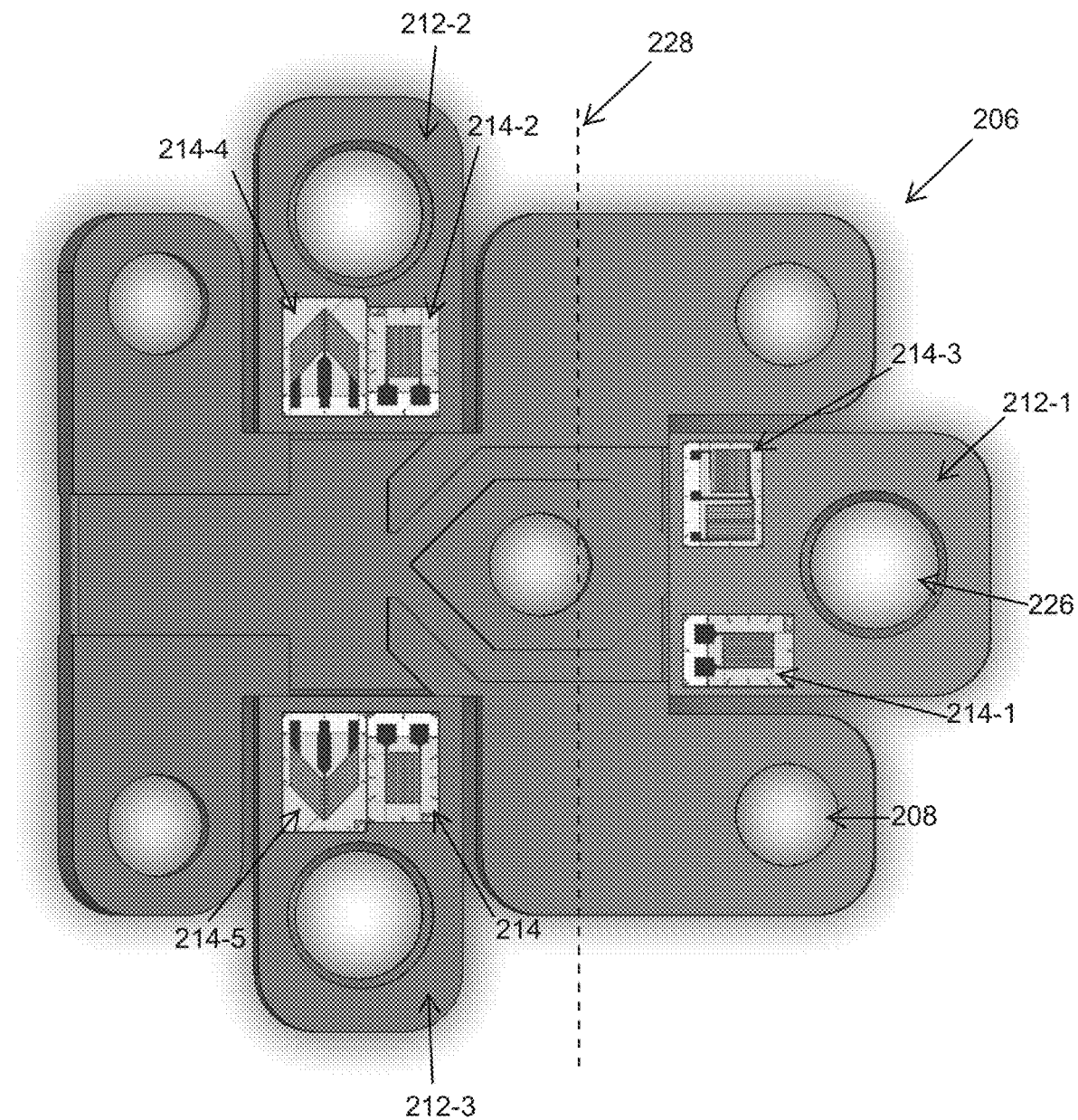
Figure 2:
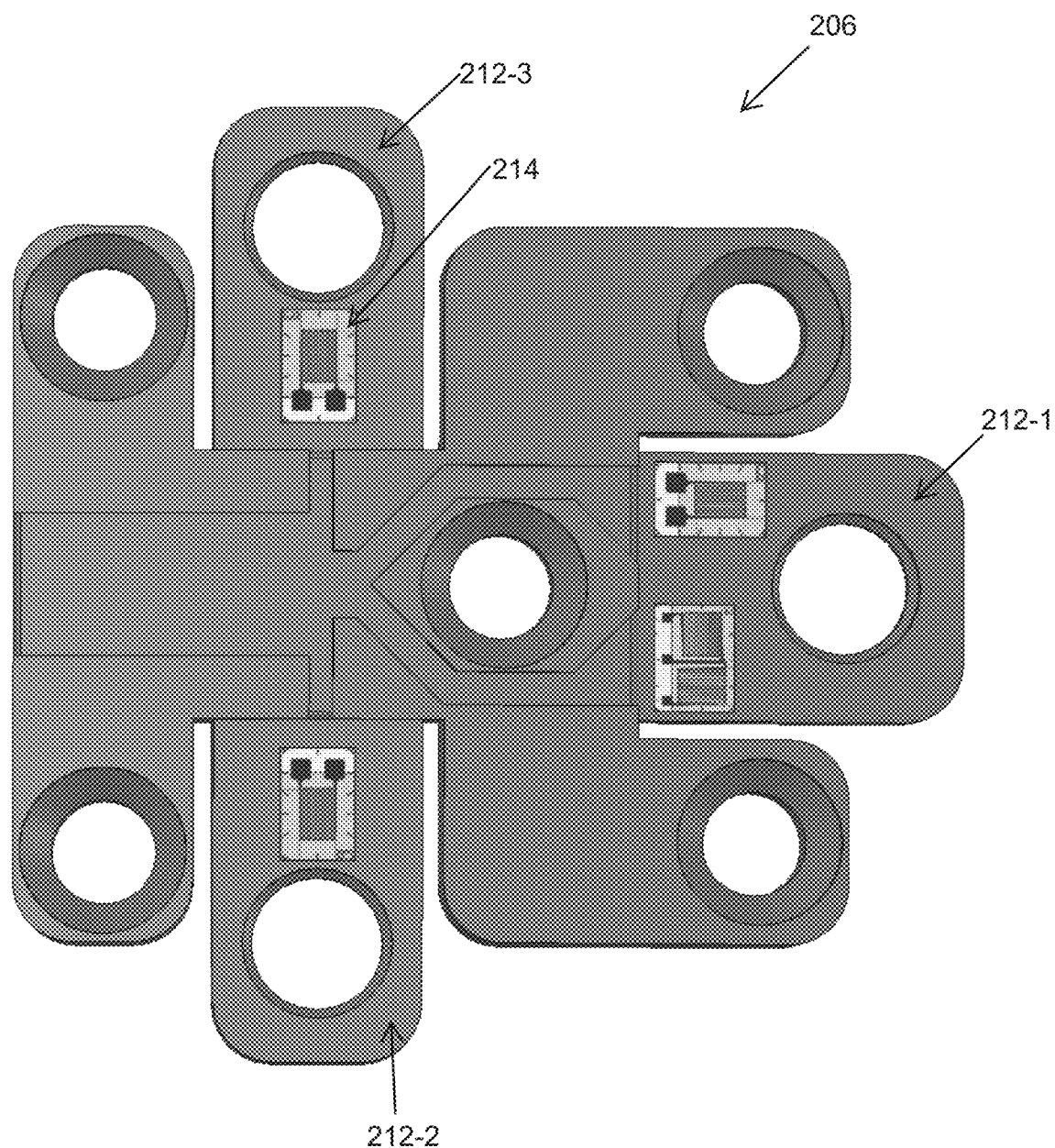
Figure 3:
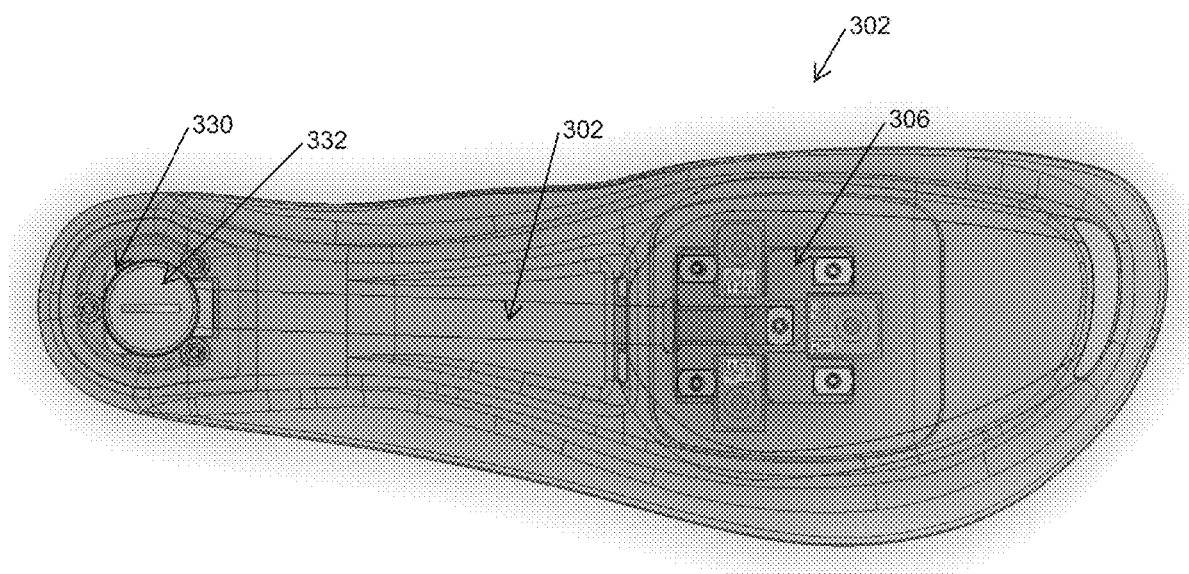

FIG. 1-3 is another perspective view of the cycling shoe 100 of FIGS. 1-1 and 1-2 showing a cleat 122 connected to the sole 102. The cleat 122 may be connected to the sole 102 through the outside of the sensor platform cover 118 and the sensor platform (e.g., sensor platform 106 of FIG. 1-1). The cleat 122 may be connected to the sole 102 using a plurality of cleat fasteners. As described above, in some embodiments, the cleat 122 may be connected to the sole 102 using two, three, or four cleat fasteners, depending on the type of cleat attached.

FIG. 2-1 is a top view of a sensor platform 206, according to at least one embodiment of the present disclosure. The sensor platform 206 may include a plurality of platform fastener inserts 208. In some embodiments, the platform fastener inserts 208 are separate components from the sensor platform 206. In other words, the platform fastener inserts 208 may be removable and/or replaceable. At least a portion of the platform fastener inserts 208 may have a non-circular shape, such that when a torque is applied to a fastener (e.g., platform fastener 110 of FIG. 1-1), the platform fastener insert 208 may resist rotation relative to the sensor platform 206. In some embodiments, the platform fastener inserts 208 may be complementary to a fastener. For example, the platform fastener inserts 208 may have threads complementary to the fastener.

In some embodiments, the sensor platform 206 includes a plurality of cleat supports 212-1, 212-2, 212-3. Each cleat support 212-1, 212-2, 212-3 may include a cleat connection 226. The number and arrangement of cleat supports 212-1, 212-2, 212-3 and/or cleat connections 226 may conform to the number and arrangement of cleat fasteners on the cleat to be used (e.g., cleat 122 of FIG. 1-3). For example, there may be two, three, or four cleat supports 212-1, 212-2, 212-3 and/or cleat connections 226. In some embodiments, the cleat supports 212-1, 212-2, 212-3 are reinforced relative to a body of the sensor platform 206, or in other words, have a greater tensile and/or compressive strength. In other embodiments, the cleat supports 212-1, 212-2, 212-3 have approximately the same strength as the body of the sensor platform 206.

The sensor platform 206 may include a plurality of sensors 214. In some embodiments, the plurality of sensors 214 may include a force sensor, a torque sensor, a temperature sensor, an accelerometer, or any combination of the foregoing. In some embodiments, a force sensor includes a strain gauge. In some embodiments, a strain gauge sensor 214 is a temperature-controlled strain gauge sensor 214. For example, the strain gauge sensor 214 may be calibrated to, designed for, and/or applied to the sensor platform 206 specifically to limit any noise or erroneous measurements by the strain gauge sensor 214 caused by the thermal expansion and contraction of the sensor platform 206. In other embodiments, the sensor 214 is an accelerometer. For example, the accelerometer may allow the calculation of cadence or position of the sensor platform 206 in a stroke. This information can be correleated to other data measurements to analyze and visualize the forces generated by a user throughout the range of motion.

In some embodiments, the plurality of cleat supports 212-1, 212-2, 212-3 includes at a least a first cleat support 212-1 that is positioned at a front of the sensor platform 216. The plurality of cleat supports 212-1, 212-2, 212-3 includes a second cleat support 212-2 and a second cleat support 212-2 that are positioned rearward of the first cleat support 212-3, relative to the sole.

In some embodiments, each cleat support 212-1, 212-2, 212-3 includes at least one sensor 214. For example, each cleat support 212-1, 212-2, 212-3 may include one sensor 214. In other embodiments, each cleat support 212-1, 212-2, 212-3 includes two, three, four, five, or six sensors 214. In some embodiments, one or more cleat supports 212-1, 212-2, 212-3 may not have any sensors 214. In some embodiments, different cleat supports 212-1, 212-2, 212-3 have different numbers of sensors 214. For example, a first cleat support 212-1 may include one sensor 214, a second cleat support 212-2 may include three sensors 214, and a third cleat support 212-3 may include five sensors 214. In other examples, a first cleat support 212-1 may not have any sensors 214, a second cleat support 212-2 may have two sensors 214, and a third cleat support 212-3 may have six sensors 214.

In some embodiments, the placement and/or orientation of a sensor 214 at least partially determines the type of information to be measured by the sensor 214. For example, a strain gauge sensor 214-1 placed on a front cleat support 212-1 with the grid oriented perpendicular to a pedal axis 228 may measure a bending strain on the front cleat support 212-1 due to a force normal, perpendicular, or oblique to the front cleat support 212-1. Similarly, a strain gauge sensor 214-2 attached on a second cleat support 212-2 with the grid oriented parallel to the pedal axis 228 may measure a bending strain on the second cleat support 212-2 due to a force normal, perpendicular, or oblique to the second cleat support 212-2. Similarly, a strain gauge sensor 214 attached on a third cleat support 212-3 with the grid oriented parallel to the pedal axis 228 may measure a bending strain on the third cleat support 212-3 due to a force normal, perpendicular, or oblique to the third cleat support 212-3. In some embodiments, the strain gauge sensor 214, 214-1, 214-2 is a quarter bridge strain gauge. In other embodiments, the strain gauge sensor 214, 214-1, 214-2 is a half bridge strain gauge or a full bridge strain gauge.

Still referring to FIG. 2-1, in some embodiments, a half bridge strain gauge sensor 214-3 is configured to measure a force parallel to a radial axis of a crank (not shown, perpendicular to pedal axis 228), or in other words, an axial force, as the pedal and crank move around the rotational axis of the crankset of the bicycle. The half bridge strain gauge sensor 214-3 may include a grid parallel to the pedal axis 228 and a grid perpendicular to the pedal axis 228. In some embodiments, a first cleat support 212-1 includes both a strain gauge sensor 214-1 configured to measure bending of the first cleat support 212-1 and a half bridge strain gauge sensor 214-3 configured to measure axial force on the first cleat support 212-1.

In some embodiments, the second cleat support 212-2 includes a shear strain gauge 214-4 configured to measure a shear strain on the second cleat support 212-2. The shear strain gauge 214-4 may include two grids oriented perpendicular to each other and may be non-parallel with the pedal axis 228. For example, the two grids may be oriented plus or minus 45° from the pedal axis 228. Similarly, the third cleat support 212-3 may include a shear strain gauge 214-5 configured to measure a shear strain on the third cleat support 212-3. In some embodiments, the shear strain gauges 214-4, 214-5 each include two quarter bridge strain gauges or a single half bridge strain gauge.

In some embodiments, any cleat support 212-1, 212-2, 212-3 includes any type of strain gauge sensor. For example, the first cleat support 212-1 may include a shear strain gauge sensor. In other examples, the second and/or third cleat support 212-2, 212-3 may include a half bridge strain gauge configured to measure axial force. In still other examples, any cleat support 212-1, 212-2, 212-3 may include any strain gauge sensor that has any orientation of grid, or any rosette. For example, a strain gauge sensor may have a rosette of three gauges oriented at 45° angles from each other. In other examples, a strain gauge sensor may have a rosette of three gauges oriented at 60° angles from each other. In still other examples, a strain gauge sensor may have a rosette of three strain gauges oriented at an angle from each other and stacked on top of each other. In still other examples, a strain gauge sensor may include any number of strain gauges oriented at any angle from each other.

FIG. 2-2 is a bottom view of the sensor platform 206 of FIG. 2-1, according to at least one embodiment of the present disclosure. In some embodiments, the sensor platform 206 may include at least one sensor 214 on a top and a bottom of the sensor platform 206. For example, a first sensor may be placed on a top of the sensor platform 206 (as shown in FIG. 2-1), and a paired sensor may be placed on a bottom of the sensor. In some embodiments, the top and/or the bottom of the sensor platform 206 has more than one sensor 214.

In some embodiments, similar sensors 214 are placed opposite each other on the same cleat support 212-1, 212-2, 212-3 to form a sensor pair or a plurality of sensor pairs. For example, a quarter bridge strain gauge sensor 214 may be placed in the same location on the top and bottom of the front cleat support 212-1, such that a line drawn vertically through the first cleat support 212-1 would intersect a first quarter bridge strain gauge sensor 214 on the top of the first cleat support 212-1 and a second quarter bridge strain gauge sensor 214 on the bottom of the first cleat support 212-1. Sensor pairs having sensors on opposing top and bottom sides of a cleat support may increase the sensitivity, reduce noise, and produce more reliable readings than having a sensor on just one side of a cleat support.

In some embodiments, a sensor pair is located on the same side of the sensor platform 206. For example, the top of the sensor platform 206 may include a first shear strain gauge sensor 214-4 on a second cleat support 212-2 and a sensor shear strain gauge sensor 214-5 on a third cleat support 212-2. This sensor pair may collect transverse shear forces, with the sensor pair collecting more accurate than a single sensor on a single cleat support. However, power and/or weight considerations may encourage the use of a single sensor on a single cleat support.

Any type of sensor may be paired with and/or placed opposite any other type of sensor. For example, a half bridge strain gauge sensor may be placed opposite another half bridge strain gauge sensor. In other examples, a quarter bridge strain gauge sensor may be placed opposite a half bridge strain gauge sensor. In still other examples, a half bridge strain gauge sensor may be placed opposite a full bridge strain gauge sensor. In some embodiments, sensors placed opposite each other have the same grid orientation. In other embodiments, sensors placed opposite each other have different grid orientations.

In some embodiments, a cycling shoe may be worn and/or used in conjunction with a non-sensing or inactive sensor platform. For example, the sensor platform may lack sensors or lack a communication means to the sensors, such that the platform itself is a placeholder in the pocket of the sole. An inactive sensor platform may be positioned in the sole to provide structural rigidity and/or to modify the structural rigidity of the sole when data collection is not needed.

FIG. 3 is a representation of a top view of a sole 302, according to at least one embodiment of the present disclosure. In some embodiments, the sensor platform 306 may be located in the front half of the sole 302, or in other words, in the toe box of the sole 302, or in still other words, in the ball of the sole 302. A battery housing 330 may be located in the rear half of the sole 302, or in other words, a heel of the sole 302. The battery housing 330 may include a battery 332. In other examples, the battery housing 330 and/or battery 332 may be located in the front half of the sole 302. In yet other examples, the battery housing 330 and/or battery 332 may be positioned externally to the sole 302, such as affixed to the upper portion of the cycling shoe.

In other embodiments, the power supply for the sensor platform 306, sensors, processor, storage device, communication device, or other electronic components of the cycling shoe may generate electricity during use. For example, the power supply may include a solar cell positioned on a top of the shoe (i.e., opposite the sole 302) to convert solar radiation to electricity during a ride. In other examples, the sole may include a kinetic energy convertor to convert the cyclic movement of the shoe into an electric current. The power supply may include a moveable weight that, when moved relative to a coil, generates an electrical current.

The battery 332 or other power supply may be connected to the sensor platform 306 via a conduit 333. At least one wire, or a plurality of wires, may connect the battery 332 with the plurality of sensors (e.g., sensors 214 of FIGS. 2-1 and 2-2) on the sensor platform 306. A wire, as used herein, may include a single conductive conduit, a plurality of conductive conduits, a flexible flat cable, a printed circuit board, a flexible printed circuit or another other conductive medium to transmit power to the sensors. In some embodiments, a printed circuit board or flexible printed circuit may include one or more sensors integrated into the printed circuit. In this manner, the plurality of sensors may be powered.

In some embodiments, the battery 332 may be a replaceable battery. In other embodiments, the battery 332 may be a rechargeable battery. The battery 332 may be recharged using any method, including plugging into a standard 120-volt AC outlet via micro-USB or other connection protocol, kinetic movement, solar, and other charging methods.

In some embodiments, the sole 302 includes a processor and a communication device. In some embodiments, the processor and communication device are located on the sensor platform 306. In other embodiments, the processor and communication device are located in the battery housing 330. In still other embodiments, the processor and communication device are located in the arch of the sole 302.

In some embodiments, the processor collects the raw data from the sensors and passes it directly to the communication device. In other embodiments, the processor collects the raw data from the sensors and converts it into a format that is transmitted by the communication device. In still other embodiments, the processor collects and analyzes the raw data from the sensors.

The communication device may be configured to communicate with a computing device using many known communications methods, such as Bluetooth, Wi-Fi, radio frequency, infrared, and other communication methods.

Figure 4:
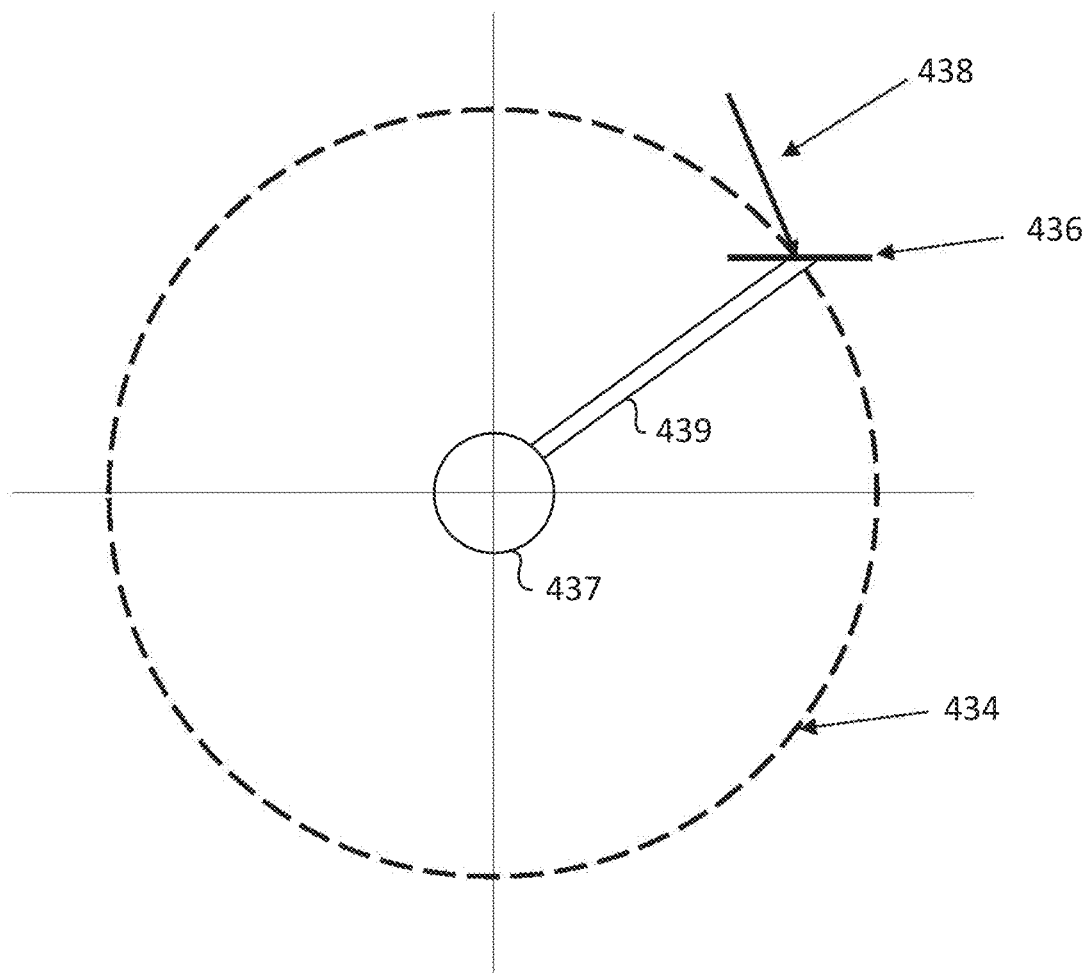
FIG. 4 is a schematic view of a path of a bicycle pedal, according to at least one embodiment of the present disclosure.

FIG. 4 is a schematic representation of a path 434 that a pedal 436 and/or cycling shoe may travel. The path 434 may be a circular path, or may be an eccentric path, about a rotational axis 437 of the crank 439. A user exerting a force 438 against the pedal 436 may cause the pedal 436 to move along the path 434. The magnitude and direction of the force 438 against the pedal 436 in any location along the path 434 will determine the speed and direction of the pedal 436. To keep the pedal 436 rotating in the same direction, the direction of the force 438 may change along the path 434. Similarly, to move the pedal 436 with a consistent power, the magnitude and direction of the force 438 changes along the path 434. The force 438 applied to the pedal 436 may include components including, relative to the crank, an axial force, a longitudinal shear stress, and a transverse shear stress.

Figure 5:
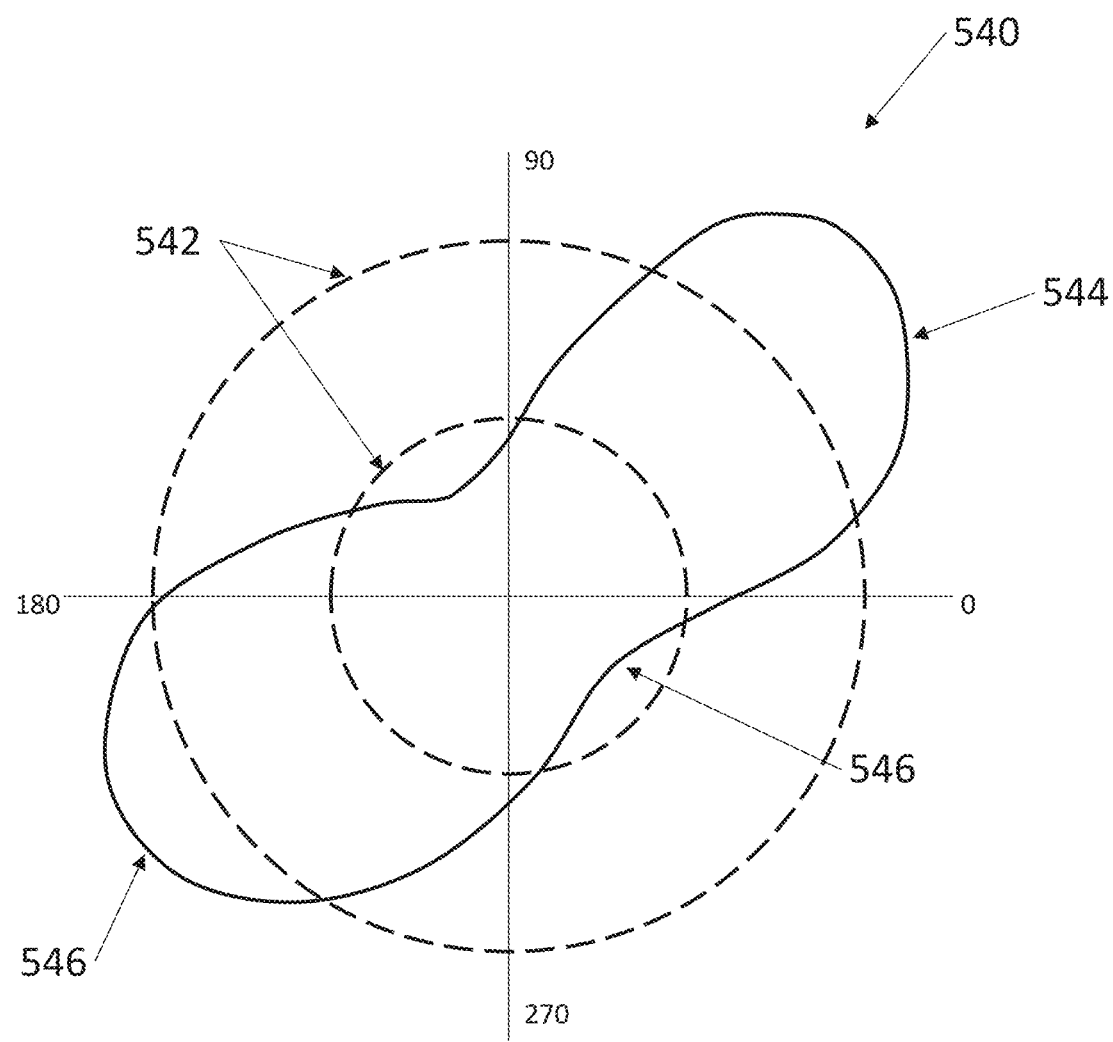
FIG. 5 is a representation of a cycling power chart, according to at least one embodiment of the present disclosure.

FIG. 5 is a schematic representation of a rotational power chart 540 in polar coordinates, with power shown radially and angle of rotation shown rotationally. The dashed lines 542 represent rotations of the crankset of equal power. The power line 544 represents the power applied to a pedal (such as pedal 436 of FIG. 4) for one full revolution along a path (such as path 434 of FIG. 4). Conventionally, a cyclist does not maintain a constant power throughout the entire pedal stroke. A cycling stroke will have two local minima 546 and two local maxima 548. The location and magnitude of the local minima 546 and local maxima 548 are not only affected by pedal location within the path, but also many user-specific factors, such as pedaling mechanics, strength, weight, aerobic fitness, or any combination of the foregoing. It should be noted that a power line 544 that has a more ovoid shape, where the minimum 546 is has a greater magnitude relative to the local maxima 548, provides more consistent power to the pedal, and therefore indicates more consistent power applied by the cyclist.

Figure 6:
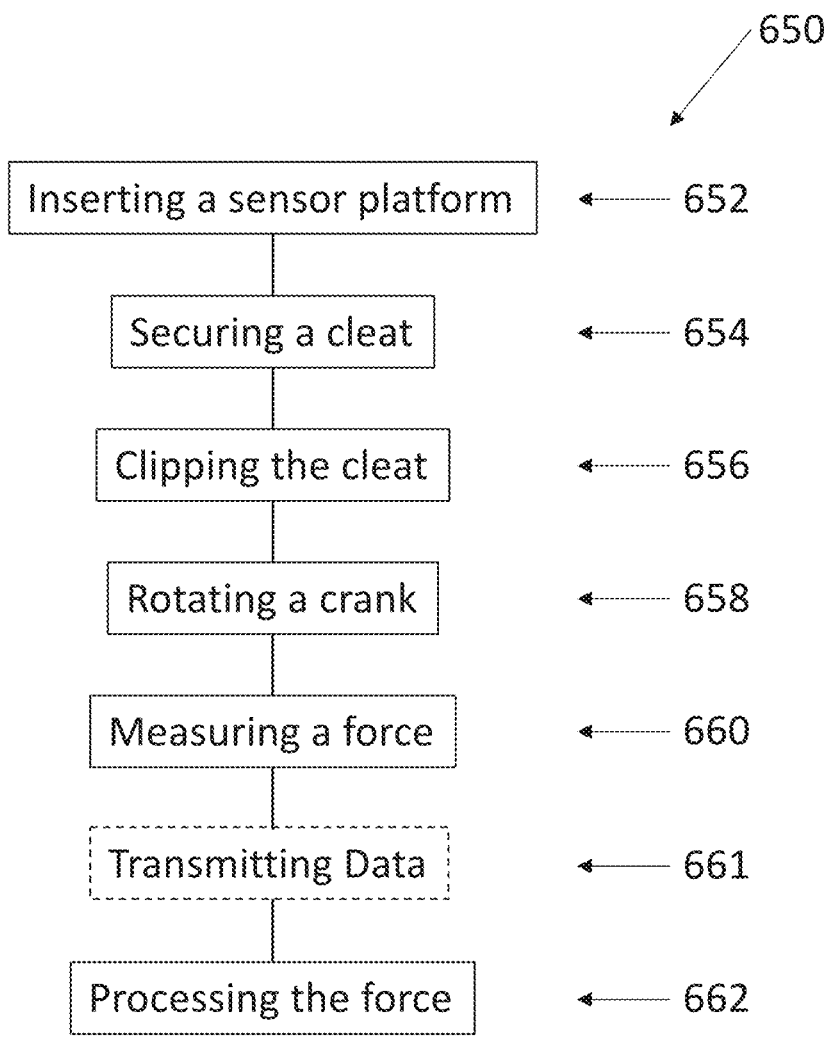
FIG. 6 is a representation of a method for measuring cycling power, according to at least one embodiment of the present disclosure.

FIG. 6 represents a method 650 for measuring cycling power. The method 650 includes inserting a sensor platform into a pocket at 652. The pocket may be located on the outside of the sole of a cycling shoe. In other examples, the pocket may be located in the sole of the cycling shoe and accessible through the inside of the shoe or through a slot, into with the sensor package may be inserted. A cleat may be secured to the outside of the sole of the cycling shoe at 654. The cleat may be secured using a plurality of cleat fasteners as described herein. In some embodiments, a platform cover is placed between the cleat and the sensor platform, to protect the sensor platform.

The method 650 may include clipping the cleat to a pedal at 656. The pedal may be attached to a crank, which is used to provide the motive force for a bicycle or a torque on a motor or other resistance system of a stationary bicycle. The crank may be rotated by applying a force through the cycling shoe to the pedal at 658. The magnitude of a plurality of components of the force may be measured by sensors on or in the sensor platform positioned between the cycling shoe and the pedal at 660. For example, the sensors of the sensor platform may measure linear forces, shear forces, torque, and other components of the force applied by the user to measure the manner and/or efficiency with which the force is transmitted from the user to the pedal. Upon measuring the force, the data may be optionally transmitted at 661 from the sensors or from the cycling shoe to a remote processor, hardware storage device, or other electronic device. The data may also be retained locally in a memory, processor, or storage device in the cycling shoe.

The magnitude of the measured components of the force is processed and communicated to a computing device at 662. In other embodiments, the measured components of the force are recorded and saved for later analysis. In yet other embodiments, the magnitude of the measured components of the force are presented in real time to a user.

INDUSTRIAL APPLICABILITY

The present disclosure relates generally to devices and methods used to measure force and power of a cyclist's pedal stroke. For example, a cyclist may wear a cycling shoe or a pair of cycling shoes having a sensor platform inserted or embedded into the sole of the cycling shoe. In some embodiments, the cycling shoe may be configured to be used with conventional pedals, or in other words, platform pedals, or pedals that do not clip into a cleat attached to the shoe. For example, such cycling shoes may be used by a mountain biker that does not wish to encumber his feet by clipping into a pedal, but still wishes to analyze the power of his pedal stroke. The sensor platform in such a cycling shoe may assist the cyclist in determining the efficiency of his pedal stroke, the placement of his foot on the pedal, or relative weight distribution on the pedals at different times during the bicycle ride.

In some embodiments, the sensor platform is inserted into the sole of a cycling shoe. A platform cover may cover the sensor platform to protect the sensor platform. In some embodiments, the platform cover may cover the entire pocket and make the pocket waterproof, thereby protecting the sensor platform from water. The platform cover may also protect the sensor platform from impacts, such as when a cyclist attempts to clip into a pedal, but misses and hits the shoe, or when a cyclist is walking while wearing the cycling shoes.

In some embodiments, the cycling shoe may not include a platform cover. For example, a cleat attached to the sensor platform may sufficiently cover the sensor platform to provide the necessary protection. In other examples, the sensor platform may include sensors internal to the sensor platform, such that the sensors are not exposed and vulnerable to damage. In still other examples, the pocket may be contained within the sole, and include a slot into which the sensor platform is inserted. In other embodiments, a platform cover may be used without an active sensor platform, with a non-sensing or inactive platform in place.

In some embodiments, all or part of the sole may be fabricated from a light-weight composite, such as carbon fiber or fiberglass. In other embodiments, all or part of the sole may be fabricated from a light-weight plastic, such as Nylon, PVC, TPU, or other light-weight plastic. In some embodiments, all or part of the sensor platform may be fabricated from a light-weight composite, such as carbon fiber or fiberglass. In other embodiments, all or part of the sensor platform may be fabricated from a composite, such as fiberglass or carbon fiber; a light-weight plastic, such as Nylon, PVC, TPU, or other light-weight plastic; or metal, such as steel, stainless steel, aluminum alloy, or titanium alloy.

A cleat may be installed onto the sole of the cycling shoe to secure the sensor platform and/or the platform cover. The cleat may be configured to clip into a matching pedal. A user wearing the cycling shoe may pedal a bicycle or stationary exercise bicycle by applying force to the shoe, through the sole, the sensor platform and/or the platform cover, to the cleat and to the pedal. The pedal is rotatably attached to a crank, which is rotationally fixed to a front cassette. A chain may connect the front cassette to a rear cassette rotationally fixed to a wheel.

A tangential force applied to the crank through the pedal will rotate the crank, which will rotate the front cassette, and through the chain, rotate the rear cassette to cause the wheel to rotate. The force a cyclist applies to the pedal over a period of time to cause the rotation is the cycling power, commonly measured in Watts (W).

Cycling power may be increased by maximizing the force applied at each stage of the pedal stroke. This may include pushing downward through the front of a pedal stroke, laterally pulling and pushing (sometimes described as scraping) through the top and bottom of a pedal stroke, and lifting through the back of a pedal stroke. One way to quantitatively analyze a cyclist's pedal stroke is to measure his power throughout the pedal stroke. Thus, they can analyze their pedal stroke and make efforts to improve it.

Installing a sensor platform in a cycling shoe may allow a user to measure power applied throughout the pedal stroke. Generally, a force measured closer to its source (e.g., the foot) will be more accurate than one measured further away from the source. Therefore, a sensor installed on the crank will be generally less accurate than a sensor installed on a pedal, which will be generally less accurate than a sensor installed in the sole of a cycling shoe. This decrease in accuracy may occur at least in part because of the losses that may occur as the force transfers from the shoe to the pedal to the crank. Therefore, by installing the sensor platform in the sole of the cycling shoe, the sensor platform is collecting accurate power information close the foot of the user. Additionally, the pedal and crank are rigid structures that transmit power relatively efficiently. The transmission of power from the shoe to the pedal exhibits greater variation than the transmission of power from the pedal to the crankset.

Having multiple sensors on the sensor platform may increase the accuracy and/or amount of the power information collected. For example, by including force measurements on a forward and two rear cleat supports, the force applied to each point of contact of the cleat with the cycling shoe may be measured, thus enabling a user to analyze force distribution between the three cleat supports. Similarly, the bending moment may be calculated for each of the cleat supports, which may allow a user or a manufacturer to understand if energy is being wasted when transferred from the cycling shoe to the cleat and the pedal. Using this feedback, a manufacturer may optimize the structure of a cycling shoe for optimal force transfer and weight distribution.

Similarly, by placing shear stress sensors in the two rear cleat supports, the transverse shear stress, or shear stress in a direction that is not axial with the crank or tangential to the path of the pedal, may be measured and calculated. Transverse shear may help a cyclist understand the extent of transverse or lateral motion or force by her foot. By understanding the location and magnitude of transverse shear, a cyclist may work to improve her stance, her pedal stroke, or may encourage her to find different or better fitting gear (such as pedals, cycling shoes, and cleats).

Placing sensors on both the top and the bottom of the sensor platform may allow for the collection of more accurate and/or additional readings. For example, by comparing measurements from opposing sensors (e.g., sensors in the same location on the top and on the bottom of the sensor platform), the noise from the sensors may be reduced. Further, having opposing sensors may improve the reliability of the system because, if one sensor fails, data will still be collected by a backup sensor.

The type of sensor used may affect both the accuracy and power usage of the sensor. For example, a half or full bridge strain gauge sensor may collect more accurate measurements but may utilize more power.

In some embodiments, the sensors may periodically or regularly take measurements according to a measuring rate. In some embodiments, the measuring rate may be in a range having an upper value, a lower value, or upper and lower values including any of 10 measurements per second, 50 measurements per second, 100 measurements per second, 200 measurements per second, 300 measurements per second, 400 measurements per second, 500 measurements per second, 600 measurements per second, 700 measurements per second, 800 measurements per second, 900 measurements per second, 1,000 measurements per second, or any values therebetween. For example, the measuring rate may be greater than 10 measurements per second. In other examples, the measuring rate may be less than 1,000 measurements per second. In yet other examples, the measuring rate may be in a range of 10 measurements per second to 1,000 measurements per second. A higher measuring rate may provide greater resolution for a power chart but will take more power to collect.

In some embodiments, the measurement collected by the sensors may be converted to a force in Newtons (N). The force multiplied by the distance over which the force is applied in meters (m) and divided by the time interval (s) will provide the power in Watts (W=N m/s). In some embodiments, the sensors of the sensor platform may be configured to measure cycling power in a range having an upper value, a lower value, or upper and lower values including any of 0 W, 50 W, 100 W, 200 W, 400 W, 600 W, 800 W, 1,000 W, 1,200 W, 1,400 W, 1,600 W, 1,800 W, 2,000 W, or any values therebetween. For example, the sensors of the sensor platform may be configured to measure cycling power of at least 400 W. Sensors configured to measure a cycling power of at least 400 W may accurately measure the cycling power of a recreational rider with a sustained cycling power between 200 and 300 W. In other examples, the sensors of the sensor platform may be configured to measure cycling power of at least 1,000 W. Sensors configured to measure a cycling power of at least 1,000 W may accurately measure the cycling power of a professional rider with a sprint cycling power between 500 and 1,000 W. In yet other examples, the sensors of the sensor platform may be configured to measure cycling power of at least 2,000 W. Sensors configured to measure a cycling power of at least 2,000 W may accurately measure the cycling power of a professional rider with a burst cycling power over 1,000 W.

The temperatures to which the sensor platform is exposed vary. By installing sensors that are specially designed, applied, and/or manufactured for a specific material and/or geometry of a sensor platform, the effects of thermal expansion and contraction may be minimized. Similarly, sensors may include "dummy" circuits that only measure the effect of temperature, thereby minimizing the effects of thermal expansion and contraction. For example, a dummy circuit may be oriented along an axis that will experience limited strain. Cyclists ride in a variety of conditions, from extreme heat (e.g., over 40° C.), to extreme cold (e.g., below 0° C.), sometimes changing from one extreme to the other within the same bicycle ride. Thus, having sensors that compensate for temperature will help to reduce erroneous readings and improve the accuracy of the sensor.

In some embodiments, the cycling shoe may include a data logger. In this manner, the data collected from the sensors during a bicycle ride may be collected and analyzed after the ride is completed. Including a data logger, rather than a communication device, may reduce the weight and/or power requirements of a power measurement system.

In other embodiments, the cycling shoe may include a processor and communication device. The data measured by the sensors may be collected by the processor and packaged for transmission to a remote device via the communication device. The data may be transmitted with a transmission rate. In some embodiments, the transmission rate may be the same as the measuring rate. In other embodiments, the transmission rate may be less than the measuring rate. For example, multiple measurements may be taken by the plurality of sensors, collected by the processor, and then packaged together for communication to the remote device. The remote device may then take and process the communicated data. Processing the communicated data may include converting the raw data collected into forces and power. Processing the communicated data may also include developing a power chart, communicating training information to the user, or other information to the user. In some embodiments, the remote device may be a smartphone, a smart watch, a tablet, a laptop or desktop computer, a bicycle computer, a stationary bicycle console, or other remote device.

In some embodiments, the remote device may communicate with or access user profiles with exercise routines specific to the selected user. An example of a user profile database that may be compatible with the principles described herein includes an iFit program available through www.ifit.com and administered through ICON Health and Fitness, Inc., located in Logan, Utah, U.S.A. An example of a program that may be compatible with the principles described in this disclosure is described in U.S. Pat. No. 7,980,996 issued to Paul Hickman. U.S. Pat. No. 7,980,996 is herein incorporated by reference for all that it discloses. However, such profile information may be available through other types of programs that contain such information. For example, such information may be gleaned from social media websites, blogs, government databases, private databases, other sources, or combinations thereof. In some examples, the user information accessible through the user profiles includes the user's age, gender, body composition, height, weight, health conditions, other types of information, or combinations thereof that may be helpful in determining the appropriate exercise routine for the user. Such user profile information may be available to the remote device through the iFit.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A device for measuring exercise power comprising:
    a shoe having a sole, wherein the sole includes a pocket on an outside surface of the sole; and
    a sensor platform configured to be placed within the pocket, the sensor platform including a sensor pair, the sensor pair including a top sensor located on a top surface of the sensor platform and a bottom sensor located on a bottom surface of the sensor platform, the top sensor and the bottom sensor being opposite each other on the sensor platform, the top surface spaced apart from the bottom surface.

2. The device of claim 1, wherein one or more of the sensor pair is a force sensor.

3. The device of claim 1, wherein the sensor platform includes a plurality of cleat supports, the sensor pair being located on at least one cleat support of the plurality of cleat supports.

4. The device of claim 3, wherein the sensor pair is configured to measure transverse shear force.

5. The device of claim 1, wherein the top sensor and the bottom sensor are strain gauges having an orientation that is the same for both the top sensor and the bottom sensor.

6. The device of claim 1, further comprising a battery located in the sole of the shoe.

7. The device of claim 1, wherein pocket is open and the sensor platform is configured to be placed directly in the pocket.

8. A system for measuring cycling power comprising:
    a cycling shoe having a sole, the sole forming a pocket on an outer surface of the sole;
    a sensor platform placed in the pocket, the sensor platform fastened to the sole and the pocket using a plurality of platform fasteners that extend into the sole, wherein a sensor is attached to the sensor platform; and
    a platform cover configured to match a peripheral contour of the sole when installed over the sensor platform and the pocket such that the platform cover has the same size as the peripheral contour of the sole.

9. The system of claim 8, wherein the platform cover is waterproof.

10. The system of claim 8, wherein the platform cover connects to the sole using a snap fit.

11. The system of claim 8, wherein the platform cover connects to the sole with a cleat fastener.

12. A system for measuring exercise power comprising:
    a shoe having a sole, wherein the sole includes a pocket; and a sensor platform configured to be placed within the pocket, the sensor platform having a top surface and a bottom surface, the bottom surface spaced apart from the top surface, the sensor platform including a plurality of sensors, a first sensor of the plurality of sensors being on the top surface of the sensor platform, and a second sensor of the plurality of sensors being on the bottom surface of the sensor platform, the second sensor facing an opening of the pocket, wherein the sensor platform is configured to be placed within the pocket.

13. The system of claim 12, wherein at least one sensor of the plurality of sensors is a strain gauge sensor.

14. The system of claim 13, wherein the at least one sensor is a shear strain gauge sensor.

15. The system of claim 13, wherein the strain gauge sensor is a temperature-controlled strain gauge sensor.

16. The system of claim 12, wherein the first sensor and the second sensor are the same.

17. The system of claim 12, wherein at least one sensor of the plurality of sensors is an accelerometer.

18. The system of claim 12, wherein the first sensor and the second sensor are located on a cleat support.

19. The system of claim 12, wherein the first sensor is placed opposite the second sensor on the sensor platform.

* * * * *